United States Patent
Jin

(10) Patent No.: US 10,332,307 B2
(45) Date of Patent: Jun. 25, 2019

(54) APPARATUS AND METHOD PERFORMING RENDERING ON VIEWPOINT DISPARITY IMAGE

(71) Applicant: Samsung Electronics Co., Ltd., Suwon-si (KR)

(72) Inventor: Seunghun Jin, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 5 days.

(21) Appl. No.: 14/993,339

(22) Filed: Jan. 12, 2016

(65) Prior Publication Data
US 2016/0328879 A1 Nov. 10, 2016

(30) Foreign Application Priority Data

May 4, 2015 (KR) .................. 10-2015-0062651

(51) Int. Cl.
*G06T 15/20* (2011.01)
*G06T 15/00* (2011.01)
(Continued)

(52) U.S. Cl.
CPC ............... *G06T 15/20* (2013.01); *G06T 1/20* (2013.01); *G06T 1/60* (2013.01); *G06T 15/005* (2013.01); *G06T 15/40* (2013.01); *G06T 15/80* (2013.01); *G06T 17/20* (2013.01); *H04N 13/0007* (2013.01); *H04N 13/0037* (2013.01); *G06T 2200/04* (2013.01); *G06T 2207/20228* (2013.01)

(58) Field of Classification Search
CPC .. G06T 15/20; G06T 1/20; G06T 1/60; G06T 15/005; G06T 15/40; G06T 15/80

USPC ......................................................... 345/420
See application file for complete search history.

(56) References Cited

U.S. PATENT DOCUMENTS

| 6,756,993 B2* | 6/2004 | Popescu ............... G06T 15/205 345/422 |
| 7,982,733 B2 | 7/2011 | Wang et al. |

(Continued)

FOREIGN PATENT DOCUMENTS

| JP | 2011-060216 A | 3/2011 |
| JP | 2014-072801 A | 4/2014 |

(Continued)

OTHER PUBLICATIONS

Zhou, Xiuzhi, "Symmetric Pixel-Group Based Stereo Matching for Occlusion Handling", 2006, IEEE Xplore, vol. 1, pp. 47-50. (Year: 2006).*

(Continued)

*Primary Examiner* — Barry Drennan
*Assistant Examiner* — Terrell M Robinson
(74) *Attorney, Agent, or Firm* — Harness, Dickey & Pierce, P.L.C.

(57) ABSTRACT

A device and method performing rendering on first and second images having binocular or viewpoint disparity are provided. The method includes determining some pixels of the second image that correspond to pixels of the first image, performing reprojection to determine, based on rendering results of the first image, color values for the pixels of the second image that are determined to correspond to the pixels of the first image, and selectively rendering remaining pixels of the second image based on the reprojection.

25 Claims, 22 Drawing Sheets

(51) Int. Cl.
*G06T 15/40* (2011.01)
*H04N 13/00* (2018.01)
*G06T 1/20* (2006.01)
*G06T 1/60* (2006.01)
*G06T 15/80* (2011.01)
*G06T 17/20* (2006.01)

(56) References Cited

U.S. PATENT DOCUMENTS

| | | | |
|---|---|---|---|
| 8,624,891 B2 | 1/2014 | Bowles et al. | |
| 9,087,410 B2 | 7/2015 | Seetharamaiah et al. | |
| 2002/0061131 A1 | 5/2002 | Sawhney et al. | |
| 2004/0238732 A1 | 12/2004 | State et al. | |
| 2011/0064299 A1* | 3/2011 | Zhang | G06T 7/55 382/154 |
| 2012/0120195 A1* | 5/2012 | Shows | H04N 13/0022 348/46 |
| 2012/0176364 A1* | 7/2012 | Schardt | G06T 15/005 345/419 |
| 2012/0176386 A1 | 7/2012 | Hutchins | |
| 2012/0293705 A1 | 11/2012 | Su | |
| 2013/0027394 A1 | 1/2013 | Kho et al. | |
| 2013/0076749 A1* | 3/2013 | Maeda | G06T 15/08 345/424 |
| 2013/0314501 A1* | 11/2013 | Davidson | H04N 13/0011 348/46 |
| 2014/0068168 A1 | 3/2014 | Murrin et al. | |
| 2014/0125650 A1 | 5/2014 | Neill | |
| 2014/0198976 A1* | 7/2014 | Coffman | G06T 7/593 382/154 |
| 2015/0170371 A1* | 6/2015 | Muninder | H04N 13/128 382/154 |

FOREIGN PATENT DOCUMENTS

| | | |
|---|---|---|
| KR | 10-2011-0134142 A | 12/2011 |
| WO | WO 98/43442 A1 | 10/1998 |
| WO | WO 01/37220 A1 | 5/2001 |
| WO | WO-2014/113189 A1 | 7/2014 |

OTHER PUBLICATIONS

Extended European Search Report dated Sep. 29, 2016, in counterpart European Patent Application No. 16168345.3 (11 pages, in English).

Rogmans, Sammy, et al. "Real-time stereo-based view synthesis algorithms: A unified framework and evaluation on commodity GPUs." *Signal Processing: Image Communication* 24.1 (2009): 49-64. (16 pages, in English).

Japanese Office Action for corresponding Japanese Application No. 2016-89073 dated Apr. 17, 2018.

* cited by examiner

FIG. 6
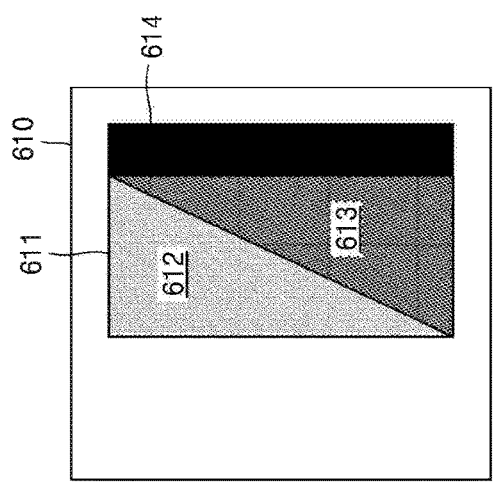
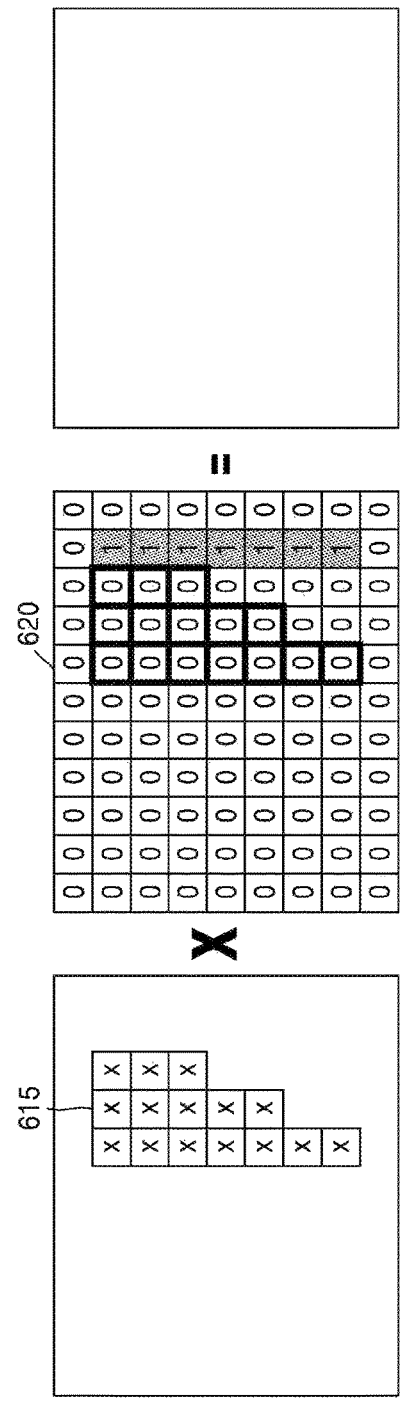

(12) United States Patent

APPARATUS AND METHOD PERFORMING RENDERING ON VIEWPOINT DISPARITY IMAGE

CROSS-REFERENCE TO RELATED APPLICATION

This application claims the benefit of Korean Patent Application No. 10-2015-0062651, filed May 4, 2015 in the Korean Intellectual Property Office, the disclosure of which is incorporated herein in its entirety by reference.

BACKGROUND

1. Field

One or more embodiments relate to an apparatus and method performing rendering on a binocular or viewpoint disparity image.

2. Description of Related Art

Graphics processing apparatuses or elements, such as a graphics processing unit (GPU), perform graphics data rendering in devices. As only an example, a graphics processing apparatus may generate a frame for display by converting graphics data corresponding to two-dimensional (2D) or three-dimensional (3D) objects into 2D pixels. The devices may include not only personal computers (PCs), laptop computers, video game consoles, but also embedded devices such as smartphones, tablet devices, and wearable devices. It is difficult for embedded devices, having characteristics of relatively low processing capability and relatively large power consumption, to have the same graphics processing capability as workstations such as PCs, laptop computers, or video game consoles having sufficient memory space and processing power. However, as portable devices such as smartphones or tablet devices have been widely distributed, users increasingly play games or watch content such as movies or dramas through their smart phones or tablet devices. Accordingly, it has been found that an embedded device with an improved or more efficient graphics processing component may be desired.

SUMMARY

One or more embodiments may provide a method of performing rendering on first and second images having binocular or viewpoint disparity, the method including performing rendering on the first image to generate depth information of the first image, determining first pixels of the second image that have determined correspondence with pixels of the first image, based on the depth information of the first image, and performing reprojection for determining pixel values of the first pixels of the second image, and selecting and rendering second pixels of the second image, different from the first pixels of the second image, based on the reprojection.

The performing of the reprojection may include generating an occlusion map that distinguishes the first pixels of the second image from the second pixels of the second image, and the selecting and rendering may include selecting and rasterizing the second pixels of the second image, based on the occlusion map.

The performing of the reprojection may include generating the occlusion map to indicate each of the first pixels of the second image in the occlusion map by a set first value and to indicate each of the second pixels of the second image in the occlusion map by a set second value, and the selecting and rendering may include selecting and rasterizing pixels of the second image for which pixels of the occlusion map have the second value.

The generating of the occlusion map may further include setting a pixel group that includes the second pixels of the second image and select pixels of the first pixels that neighbor the second pixels, and setting each pixel of the pixel group in the occlusion map to be the second value.

When respective rendering performed on the first and second images is tile-based rendering, the selecting and rendering may further include determining whether to perform scheduling on each tile of the second image, based on the occlusion map, and performing tile-rendering on a tile to be scheduled, based on a result of the determining of whether to perform the scheduling.

The performing of the reprojection may include setting a first pixel group, which includes the second pixels of the second image and some of the first pixels of the second image, to a predetermined value to generate an expanded occlusion map, and the selecting and rendering may include selecting and rasterizing the first pixel group, based on the expanded occlusion map.

The performing of the reprojection may include determining respective depth values of each of the first pixels of the second image to be the depth value of a determined corresponding pixel of the first image and determining a depth value of each of the second pixels of the second image to be a pre-set value that meets a depth test, to generate a depth buffer of the second image, and the selecting and rendering may further include performing the depth test on the first pixels and the second pixels of the second image using the depth buffer of the second image and performing pixel shading on only pixels of the second image that meet the depth test during rendering of the second image.

The performing of the reprojection may include determining respective color values of each of the first pixels of the second image to be a color value of a determined corresponding pixel of the first image and determining a color value of each of the second pixels of the second image to be a pre-set value, based on color information of the first image that is generated as a result of the rendering performed on the first image, to generate a color buffer of the second image, and the selecting and rendering may further include calculating respective color values for each of the second pixels of the second image, and changing the determined pre-set color value of each of the second pixels of the second image to respectively be the calculated respective color values for each of the second pixels of the second image, to revise the color buffer of the second image.

The performing of rendering on the first image to generate the depth information of the first image may include receiving a draw command for the first and second images, and performing the rendering on the first image based on the received draw command.

The draw command may include state information for each of the first and second images.

When respective rendering to be performed on the first and second images is tile-based rendering, the performing of rendering on the first image to generate the depth information of the first image may include performing rendering on each tile of the first image to generate a depth buffer for each of the tiles, and the performing of reprojection may include determining first pixels of the second image that correspond to pixels of each of the tiles of the first image, based on the depth buffer of each of the tiles.

When respective rendering to be performed on the first and second images is tile-based rendering, the method may further include performing tile binning on the first and second images, based on a draw command for the first and second images.

The performing of tile binning may further include dividing the draw command into batches and assigning the batches to a plurality of graphics pipelines, and, when a first batch of the batches is assigned to a first graphics pipeline of the plurality of graphics pipelines, performing tile binning on each of the first and second images based on the first batch and state information corresponding to the first batch.

One or more embodiments may provide a rendering device, the device including a graphics processing unit (GPU) configured to perform rendering on a first image to generate depth information of the first image, and a memory configured to store the depth information of the first image, wherein the GPU is configured to determine first pixels of the second image that correspond to pixels of the first image, based on the depth information of the first image, to perform reprojection to determine pixel values of the first pixels of the second image, and to select and render second pixels of the second image, different from the first pixels of the second image, based on the reprojection, and wherein the first and second images have binocular or viewpoint disparity.

The GPU may include a shader configured to generate an occlusion map that distinguishes the first pixels of the second image from the second pixels of the second image, and a rasterizer configured to select and rasterize the second pixels of the second image based on the occlusion map.

The shader may generate the occlusion map to indicate each of the first pixels of the second image in the occlusion map by a set a first value and to indicate each of the second pixels of the second image in the occlusion map by a set second value, and the rasterizer may select and rasterize pixels of the second image for which pixels of the occlusion map have the second value.

In the generating of the occlusion map, the shader may set a pixel group that includes the second pixels of the second image and select pixels of the first pixels that neighbor the second pixels, and set each pixel of the pixel group in the occlusion map to be the second value.

The shader may set a first pixel group, which includes the second pixels of the second image and some of the first pixels of the second image, to a predetermined value to generate an expanded occlusion map, and the rasterizer may select and rasterize the first pixel group based on the expanded occlusion map.

The GPU may further include a scheduler configured to determine whether to perform scheduling on each of plural tiles of the second image, based on the occlusion map, and a graphics pipeline configured to perform tile-rendering on a tile to be scheduled, based on the determining by the scheduler.

The GPU may further include a shader configured to determine respective depth values of each of the first pixels of the second image to be the depth value of a determined corresponding of pixel of the first image and to determine a depth value of each of the second pixels of the second image to be a pre-set value that meets a depth test, to generate a depth buffer of the second image, and a Z-tester configured to perform a depth test on the first pixels and the second pixels of the second image using the depth buffer of the second image, wherein the GPU may perform pixel shading on only pixels of the second image that meet the depth test during rendering of the second image.

The GPU may further include a shader configured to determine respective color values of each of the first pixels of the second image to be a color value of a determined corresponding pixel of the first image and to determine a color value of each of the second pixels of the second image to be a pre-set value, based on color information of the first image that is generated as a result of the rendering performed on the first image, to generate a color buffer of the second image, and the GPU may calculate respective color values for each of the second pixels of the second image, and change the determined pre-set color value of each of the second pixels of the second image to respectively be the calculated respective color values for each of the second pixels of the second image, to revise the color buffer of the second image.

The GPU may receive a draw command for the first and second images, and perform the rendering on the first image based on the received draw command.

The draw command may include state information for each of the first and second images.

The GPU may be configured to perform rendering on each of plural tiles of the first image to generate a depth buffer of each of the tiles, the memory may store the depth buffer of each of the tiles, and the GPU may be configured to determine first pixels of the second image that correspond to pixels of each of the tiles of the first image based on the depth buffer of each of the tiles and to perform the reprojection based on the determined first pixels of the second image that correspond to the pixels of the tiles.

The GPU may be configured to perform tile binning on the first and second images based on a draw command for the first and second images.

The GPU may be configured to divide the draw command into batches and assign the batches to a plurality of graphics pipelines, and for when a first batch of the batches is assigned to a first graphics pipeline of the plurality of graphics pipelines, the GPU may be configured to perform tile binning on each of the first and second images based on the first batch and state information corresponding to the first batch.

One or more embodiment provide a non-transitory recording medium including coding to control at least one processing device to implement one or more method embodiments described herein.

Additional aspects will be set forth in part in the description which follows and, in part, will be apparent from the description, or may be learned by practice of embodiments.

BRIEF DESCRIPTION OF THE DRAWINGS

These and/or other aspects will become apparent and more readily appreciated from the following description of one or more embodiments, taken in conjunction with the accompanying drawings in which:

FIG. 6 illustrates an example in which a rasterizer performs rasterization based on an occlusion map, according to one or more embodiments;

DETAILED DESCRIPTION

Figure 1:
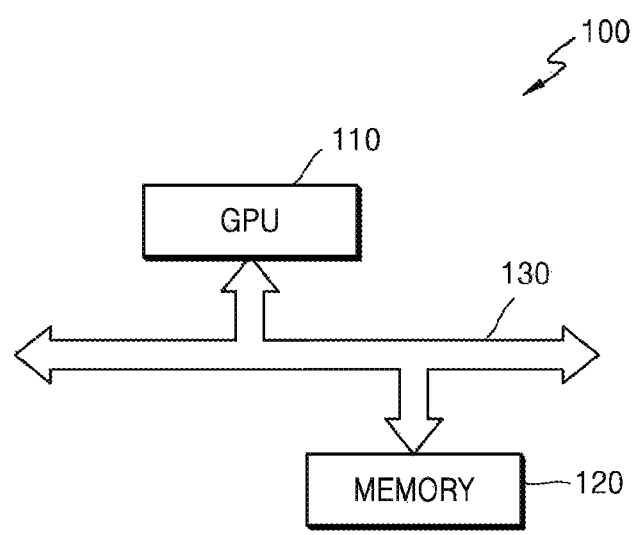
FIG. 1 is a block diagram of a device, according to one or more embodiments.

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that may be well known to one of ordinary skill in the art may be omitted for increased clarity and conciseness.

The features described herein may be embodied in different forms, and are not to be construed as being limited to the examples described herein.

Various alterations and modifications may be made to the described embodiments, some of which will be illustrated in detail in the drawings and detailed description. However, it should be understood that these embodiments are not construed as limited to the illustrated forms and include all changes, equivalents, or alternatives within the idea and the technical scope of this disclosure.

Terms used herein are to merely explain specific embodiments, and thus are not meant to be limiting. A singular expression includes a plural expression except when two expressions are contextually different from each other. For example, as used herein, the singular forms "a," "an" and "the" are intended to include the plural forms as well, unless the context clearly indicates otherwise. The use of any and all examples, or exemplary language (e.g., "such as") provided herein, is intended merely to better illuminate the underlying concept and does not pose a limitation on the scope of the disclosure. Herein, the terms "include" or "have" are also intended to indicate that characteristics, figures, operations, components, or elements disclosed on the specification or combinations thereof exist. The term "include" or "have" should be understood so as not to pre-exclude the existence of one or more other characteristics, figures, operations, components, elements or combinations thereof or additional possibilities. In addition, terms including ordinal numbers such as 'first', 'second', etc., are used for convenience of description to describe or differentiate between various elements but the elements should not be defined by these terms, and unless contextually having a different meaning are not intended to represent a required sequence or ordering.

Unless otherwise defined, all terms including technical and scientific terms used herein have the same meaning as commonly understood by one of ordinary skill in the art to which this invention belongs, in view of the present disclosure. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, certain embodiments will be explained in more detail with reference to the attached drawings, wherein like reference numerals refer to like elements throughout. Like or the same component or components corresponding to each other will be provided with the same reference numeral, and their detailed explanation will be omitted. When it is determined that a detailed description of a related or known function or configuration may make a purpose of an embodiment of the present disclosure unnecessarily ambiguous verbose, such a detailed description may be omitted.

In addition, herein and as only examples and in addition to below furthering explanations, devices 100, 400, 1100, 1500, 1600, 1700, and 2100 are hardware devices that may be desktop computers, laptop computers, smart phones, personal digital assistants (PDAs), portable media players, video game consoles, television set-top boxes, tablet devices, e-book readers, or wearable devices, but are not limited thereto, as additional embodiments are also available. Further, the devices 100, 400, 1100, 1500, 1600, 1700, and 2100 may be devices configured to realize virtual reality. For example, the devices 100, 400, 1100, 1500, 1600, 1700, and 2100 may be head mounted displays (HMDs), e.g., where the devices include at least one display or are devices configured for connection and interaction with such one or more displays. In other words, in one or more embodiments, the devices 100, 400, 1100, 1500, 1600, 1700, and 2100 may be devices configured to have a graphics processing capability for the display of content, and examples of the devices 100, 400, 1100, 1500, 1600, 1700, and 2100 may include various hardware devices.

In embodiments, and only as examples and in addition to below furthering explanations, graphics processing units (GPUs) 110, 410, 1110, 1530, 1630, 1730, and 2150, as dedicated graphics processors, may be hardware implemented to render three-dimensional (3D) objects on a 3D image into a two-dimensional (2D) image for display. For example, the GPUs 110, 410, 1110, 1530, 1630, 1730, and 2150 may be configured to perform various graphic processing operations, such as shading, blending, and illuminating, as only examples, and various graphic operations for generating pixel values for pixels to be displayed.

In embodiments, and only as examples and in addition to below furthering explanations, memories 120, 420, 1120, 1540, 1640, 1740, and 2160 may be hardware for storing various data processed by the devices 100, 400, 1100, 1500, 1600, 1700, and 2100. For example, the memories 120, 420, 1120, 1540, 1640, 1740, and 2160 may store data processed and data to be processed by the GPUs 110, 410, 1110, 1530, 1630, 1730, and 2150. In addition, the memories 120, 420, 1120, 1540, 1640, 1740, and 2160 may store computer/processor readable code of applications and drivers which are to be driven by the GPUs 110, 410, 1110, 1530, 1630, 1730, and 2150. The memories 120, 420, 1120, 1540, 1640, 1740, and 2160 each may include random access memory (RAM), such as dynamic random access memory (DRAM) and static random access memory (SRAM), read-only memory (ROM), electrically erasable programmable read-only memory (EEPROM), CD-ROM, blu-ray or another optical disc storage, hard disk drive (HDD), solid state drive (SSD), or a flash memory, or may include an external storage device that may be accessed by the devices 100, 400, 1100, 1500, 1600, 1700, and 2100. In addition, in one or more embodiments, one or more method operations discussed herein may be implemented by computer/processor readable code recorded in such a hardware memory or other non-transitory medium.

In embodiments, as only examples and in addition to below furthering explanations, buses 130, 430, 1130, and 2170 are hardware that connect the example illustrated components, i.e., various pieces of hardware, in the devices 100, 400, 1100, 1500, 1600, 1700, and 2100 so as to transmit and receive data between the various pieces of hardware. The buses 130, 430, 1130, and 2170 may include various types of buses, such as a PCI bus and a PCI Express bus, as only examples.

In embodiments, the GPUs 110, 410, 1110, 1530, 1630, 1730, and 2150 may perform rendering on at least two different viewpoint images of plural related viewpoint images, such as a binocular disparity image representing a left viewpoint image and right viewpoint image. In other words, in this example and in one or more embodiments, the GPUs 110, 410, 1110, 1530, 1630, 1730, and 2150 may perform rendering on each of first and second images having binocular disparity and display a binocular disparity image. For example, in an embodiment, the first image may be an image for the left eye and the second image may be an image for the right eye. Hereinafter, for the convenience of explanation, a referred to first image and second image is referring to a first image and a second image that have binocular or viewpoint disparity.

FIG. 1 is a block diagram of a device 100, according to one or more embodiments.

Referring to FIG. 1, the device 100 may include a GPU 110, a memory 120, and a bus 130, for example, noting that elements in addition to the illustrated elements may be further included.

According to an embodiment, the GPU 110 may perform rendering on a first image. According to an embodiment, the GPU 110 may perform rendering on the first image to generate depth information of the first image. The depth information of the first image may include a depth value of each of the pixels of the first image. For example, the depth information of the first image may be a depth buffer of the first image. Also, according to an embodiment, the GPU 110 may perform rendering on the first image to generate color information of the first image. The color information of the first image may include a color value of each of the pixels of the first image. For example, the color information of the first image may be a color buffer of the first image.

According to an embodiment, the memory 120 may store the depth information of the first image, which is generated as a result of rendering performed on the first image. Also, according to an embodiment, the memory 120 may store the color information of the first image, which is generated as a result of the rendering performed on the first image.

According to an embodiment, the GPU 110 may perform reprojection based on the depth or color information of the first image stored in the memory 120. Herein, reprojection may be an operation of respectively determining some (or which) pixels (i.e., first pixels) of a second image that correspond to the pixels of the first image, and determining pixel values of such first pixels of the second image to be the same or match the respective pixel values of the determined corresponding pixels of the first image. Each of the respective pixel values may be, for example, a depth or color value of a pixel. According to an embodiment, the reprojection may include, and respectively indicate such determinations through, a process of generating an occlusion map and a color buffer of the second image, e.g., based on the depth information and the color information of the first image. Also, or as an alternative, the reprojection may include, and respectively indicate such determinations through, a process of generating a depth buffer of the second image and a color buffer of the second image, e.g., based on the depth information and the color information of the first image.

When the first image is an image obtained by rendering an object based on a first viewpoint and the second image is an image obtained by rendering the object based on a second viewpoint, a particular pixel of the first image may be determined to correspond to a particular pixel of the second image when a predetermined portion of the object is shown by the particular pixel of the first image and the predetermined portion of the same object is shown by the particular pixel of the second image. When the first viewpoint is a left eye and the second viewpoint is a right eye, coordinates of the particular pixel of the second image, determined to be corresponding to the particular pixel having (x, y) coordinates of the first image, may be (x+d, y). In other words, the location or position of the particular pixel of the second image corresponding to the particular pixel of the first image may have a difference by a variation d on the X-axis. In addition, since an object seen at the first viewpoint may not be seen at the second viewpoint, not all pixels of the first image may have corresponding pixels in the second image. In other words, there may be only some pixels (i.e., first pixels) of the second image that have a respective corresponding relation with pixels of the first image, while there may be some other pixels (i.e., second pixels) of the second image that do not have a respective corresponding relation with any of the pixels of the first image.

According to an embodiment, the GPU 110 may determine such first pixels of the second image corresponding to pixels of the first image based on the depth information of the first image, for example. A more detailed embodiment is described below with reference to FIGS. 2A-2B.

Figure 2A:
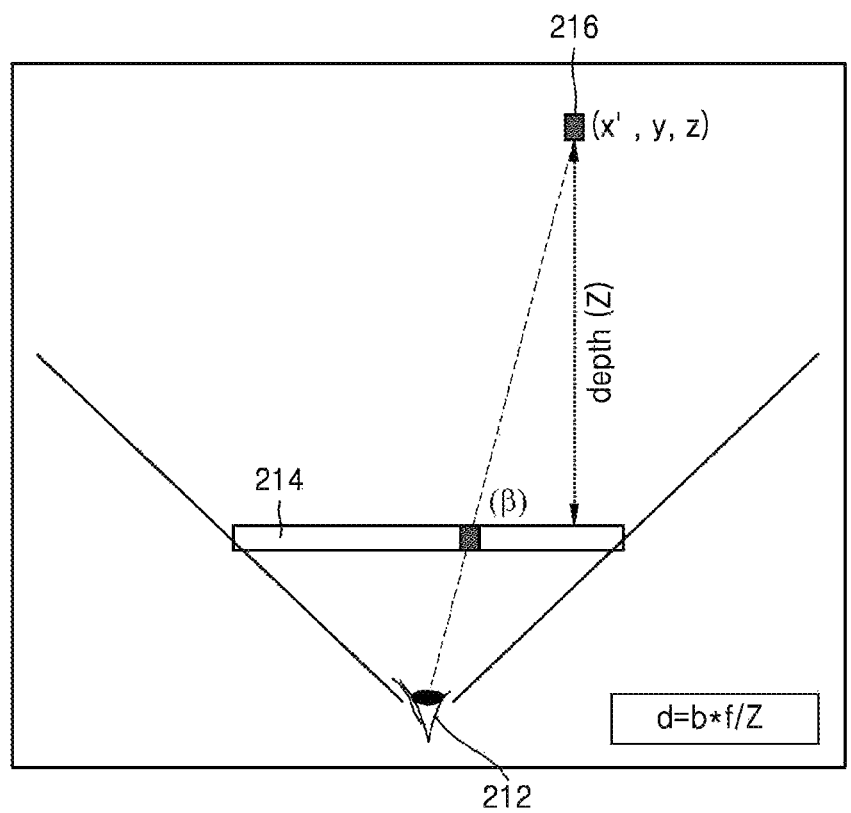
FIGS. 2A-2B illustrate an example in which a graphics processing unit (GPU) determines a pixel of a second image corresponding to a pixel of a first image, according to one or more embodiments.
Figure 2B:
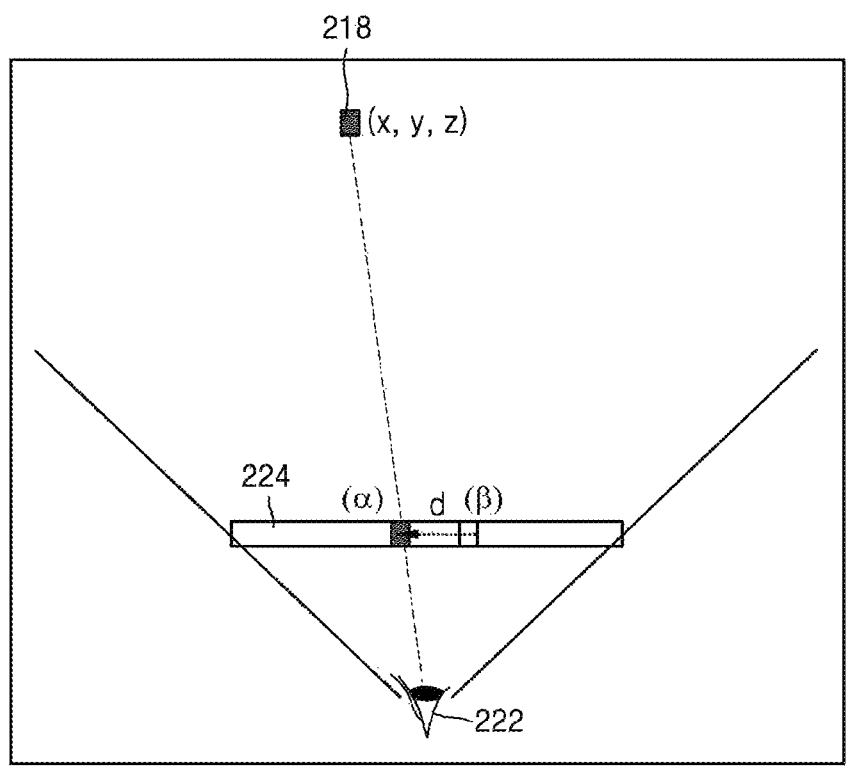

FIGS. 2A-2B illustrate a method by which the GPU 110, as only an example, may determine that a pixel of a second image corresponds to a pixel of a first image, according to one or more embodiments.

FIG. 2A illustrates a first image 214 rendered based on a first camera viewpoint 212, and FIG. 2B illustrates a second image 224 rendered based on a second camera viewpoint 222. For example, in an embodiment, the first camera viewpoint 212 may correspond to a position or viewpoint of a left eye, so the first image 214 may be a left eye image. In such an embodiment, the second camera viewpoint 222 may correspond to a position or viewpoint of a right eye, so the second image 224 may be a right eye image. According to FIG. 2A, since an object 216 having a depth value z may be shown by a β pixel of the first image 214, the coordinates of the β pixel of the first image 214 may be represented as (x', y, z).

Furthermore, the GPU 110 may determine an α pixel of the second image 224 that corresponds to the β pixel of the first image 214 based on information about the first and second camera viewpoints 212 and 222 and coordinate information of the β pixel. In other words, an object 218 may be the same as the object 216 of FIG. 2A, represented by the α pixel of the second image 224 being determined to correspond the β pixel of the first image 214. According to an embodiment, the GPU 110 may determine the α pixel of the second image 224 corresponding to the β pixel of the first image 214, through the following Equation 1, for example.

$$d = b \times \frac{f}{z}$$

Equation 1

In Equation 1, variables "b" and "f" respectively represent information about the first and second camera viewpoints 212 and 222. Here, variable "b" denotes a baseline, variable "f" denotes a focal length, variable "z" denotes a depth value of the β pixel of the first image 214, and "d" denotes a variation of X coordinates of the β pixel. Accordingly, the GPU 110 may calculate d through Equation 1 and determine (x, y, z)=(x'-d, y, z) as the coordinates of the α pixel of the second image 224. In other words, the GPU 110 may determine which pixel of the second image 224, i.e., the α pixel of the second image 224, corresponds to the β pixel of the first image 214 by using the information about the first and second camera viewpoints 212 and 222 and the depth value of the β pixel of the first image 214, without performing rendering on the second image 224. Accordingly, the GPU 110 may further determine or set a depth and/or color value for the α pixel of the second image 224 to be the same or match the depth or color value of the of the β pixel of the first image 214, and in an embodiment, the GPU 110 may determine or set a depth and/or color value for the α pixel of the second image 224 to be the same or match the depth or color value of the β pixel of the first image 214 before rendering is performed on the second image 224. Again, in this example, the depth or color values of the β pixel of the first image 214 can be determined during the rendering of the first image 214 for the β pixel, and depth and/or color values of the corresponding α pixel of the second image 224 may be determined or set based on the rendering results of the first image 214 before rendering of the second image 224.

According to an embodiment, the GPU 110 of FIG. 1 may perform a reprojection to generate an occlusion map. Herein, the occlusion map denotes a map for distinguishing some pixels (i.e., first pixels) of the second image 224 that respectively correspond to pixels of the first image 214 from some other pixels (i.e., second pixels) of the second image 224 that each do not have corresponding pixels in the first image 214. Accordingly, in an embodiment, the GPU 110 may determine such first pixels of the second image, e.g., based on the depth information of the first image, and generate an occlusion map that distinguishes each of the first pixels of the second image 224 from each of the second pixels of the second image 224.

As discussed above, based on a color buffer of the first image 214 generated based on a rendering of the first image 214, the GPU 110 may determine or set a respective color value of each of the first pixels of the second image 224 to be the same or match the color value of each of the determined corresponding pixels of the first image 214, and may also determine or set a color value of each of the second pixels of the second image 224 to be an arbitrary value, e.g., a same arbitrary value, to generate a color buffer for all pixels of the second image 224. The arbitrary value may be a value previously determined by a user. Furthermore, when generating the occlusion map, the GPU 110 may identify the second pixels of the second image based on their determined or set arbitrary value in the color buffer of the second image 224. For example, the GPU 110 may identify those pixels that have the arbitrary color value as being the second pixels and/or identify those pixels that don't have the arbitrary color value as being the first pixels. The occlusion map may later be used during or for the rendering of the second image 224 to select which of the pixels of the second image 224 will be rendered, e.g., some or all of the first pixels of the second image 224 may not be rendered during the rendering of the second image 224.

According to an embodiment, the memory 120 may store the occlusion map generated by the GPU 110 or the color buffer of the second image 224.

According to an embodiment, as noted, the GPU may perform selective rendering on pixels of the second image 224, after the rendering of the first image 214 and the generation of the color buffer for the second image 224 or the occlusion map. The GPU 110 may perform the selective rendering on pixels of the second image based on the occlusion map or the color buffer stored in the memory 120. For example, according to an embodiment, the GPU 110 may select the determined second pixels of the second image 224, i.e., those pixels of the second image 224 previously determined to not correspond to pixels of the first image 214, to perform rendering on only the selected second pixels, based on the occlusion map stored in the memory 120. Since, in the occlusion map, the determined first pixels of the second image 224 are distinguished from the determined second pixels of the second image 224, the GPU 110 may perform rasterization on the second pixels of the second image 224, while not performing rasterization on the first pixels of the second image 224, according to the occlusion map. In addition to the rasterization, the GPU 110 may perform additional calculations or graphic processing, such as respective pixel shading, on only each of the second pixels of the second image 224 and consequently calculate a color value, or updated color value, of each of the second pixels of the second image 224. For example, the GPU 110 may read the color buffer of the second image 224, previously stored in the memory 120 as discussed above, and modify or update the color buffer of the second image 224 through the respectively newly set color values of each of second pixels of the second image 224. In other words, the GPU 110 may change the example previously set arbitrary value set in the color buffer of the second image 224 for the second pixels of the second image 224 to respectively newly set color values that are calculated as a result of the selective rendering of the second image 224.

Accordingly, the GPU 110 may complete or finalize the color buffer of the second image 224 without performing rendering on all pixels of the second image 224, but rather, by selecting and rendering pixels of the second image 224 that are determined to not have corresponding pixels in the first image 214. According to an embodiment, the device 100 may output the second image 224 through the completed/finalized color buffer of the second image 224.

As noted above, and according to an embodiment, the GPU 110 may perform reprojection, and may determine or set respective depth values of each of the example first pixels of the second image 224 that correspond to pixels of the first image 214 so that they have the same depth value as their corresponding pixels of the first image 214. In addition, in this process, the depth values of each of the example second pixels of the second image 224 may be determined or set to be a predetermined value. These depth determining/setting processes may thereby generate a depth buffer of the second image 224. As only an example, the predetermined value may be a clear value (i.e., an initial value) previously set by a user. Likewise, the GPU 110 may determine or set a color value of each of the first pixels of the second image 224 to be the respective color value of the corresponding pixel of the first image 214 and determine or set the color value of each of the second pixels of the second image 224 to be an arbitrary value, to thereby generate a color buffer of the second image 224 representing the first and second pixels of the second image 224.

According to an embodiment, the memory 120 may store the depth buffer and the color buffer of the second image 224, generated by the GPU 110.

Similar to above, and according to an embodiment, the GPU 110 may perform selective rendering on pixels of the second image 224 based on these stored depth and color buffers of the second image 224. According to an embodiment, the GPU 110 may select and render the second pixels of the second image 224 that do not correspond to pixels of the first image 214 as indicated by the depth buffer of the second image 224. According to an embodiment, the GPU 110 may perform a Z-test (i.e. depth test), based on the stored depth buffer of the second image 224, on the pixels of the second image 224, including the first pixels of the second image 224 that correspond to pixels of the first image 214 and the second pixels of the second image 224 that not correspond to pixels of the first image 214 by using the depth buffer of the second image 224. In the depth buffer of the second image 224, stored in the memory 120, as a result of the previously performed reprojection process, some pixels of the second image 224 have depth values that match depth values of their corresponding pixels in the first image 214 and thus may not pass the Z-test, while other pixels (i.e., the second pixels) of the second image 224 may pass the Z-test. Accordingly, based on the results of the Z-tests, the GPU 110 will not perform calculation or graphics processing on the pixels of the second image 224 that failed the Z-test, while the GPU 110 will perform calculation or graphics processing on pixels of the second image 224 that do pass the Z-test. Here, the pixels of the second image 224 that pass the Z-test may pass the Z-test because their respective depth values in the depth buffer of the second image 224, stored in the memory 120 and previously set in the reprojection process, have the previously set predetermined value that is designed to pass the Z-test. According to an embodiment, the GPU 110 may perform pixel shading on such Z-test passing pixels of the second image 224, and as a result, the GPU 110 may calculate or update the respective color value of each of these Z-test passing pixels of the second image 224. Accordingly, the GPU 110 may modify or update the color buffer of the second image 224, previously stored in the memory 120, by changing the respective arbitrary value previously determined or set in the color buffer of the second image 224 to the newly determined respective color value of each of Z-test passing pixels of the second image 224, which are calculated as a result of the selective rendering of the second image 224.

Accordingly, the GPU 110 may complete or finalize the color buffer of the second image 224 by selecting and rendering select pixels of the second image 224 that have previously been determined to not have respective corresponding pixels in the first image 214. According to an embodiment, the device 100 may then output the second image 224 through the completed/finalized color buffer of the second image 224.

Accordingly, since the device 100 may not perform rendering on all pixels of the second image 224 when rendering the second image 224, but rather selects and renders only, for example, those pixels of the second image 224 that have previously been determined to not correspond to pixels of the first image 214 when rendering the second image 224, the number of calculations may be reduced, thereby improving the performance of the device 100. In other words, since the device 100 may obtain pixel values for some pixels of the second image 224 that correspond to pixels of the first image 214 through reprojection based on results of the rendering of the first image 214, rather than through a rendering of the second image 224, the number of calculations may be reduced compared to a case of where rendering is performed on all pixels of the second image 224.

Figure 3:
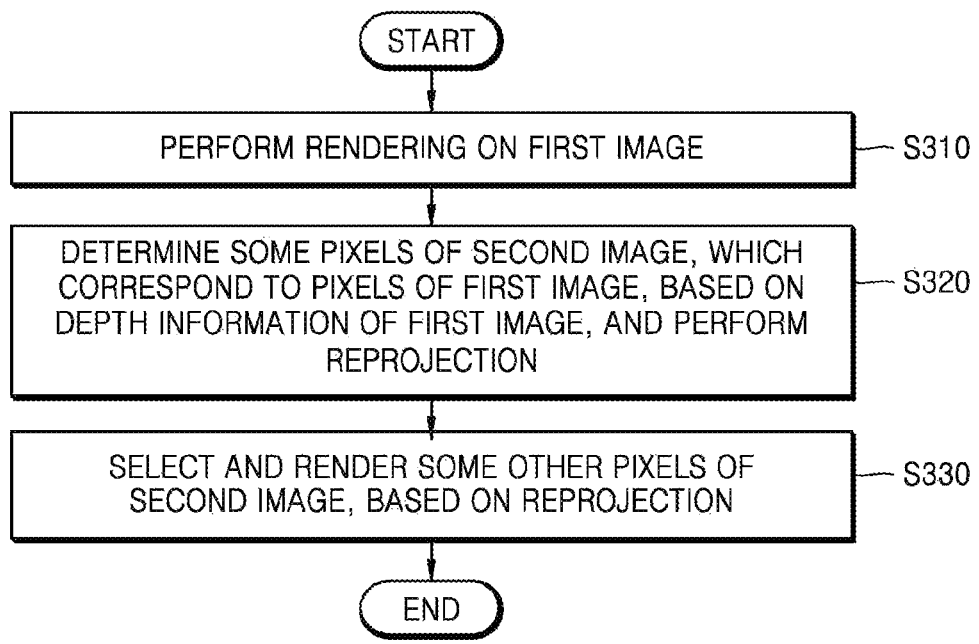
FIG. 3 is a flowchart illustrating a method by which a device performs rendering on first and second images having binocular or viewpoint disparity, according to one or more embodiments.

FIG. 3 is a flowchart illustrating a method by which the device 100, as only an example, may perform rendering on first and second images having binocular or viewpoint disparity, according to one or more embodiments.

In this example, as the method illustrated in FIG. 3 is being explained through operations of the device 100 of FIG. 1, again as only an example, repeated descriptions regarding operations of device 100 are omitted.

In operation S310, the device 100 may perform rendering on the first image. According to an embodiment, the device 100 may perform rendering on the first image to generate depth information of the first image. The depth information of the first image may be stored in a depth buffer of the first image. Also, according to an embodiment, the device 100 may perform rendering on the first image to generate color information of the first image. The color information of the first image may be stored in a color buffer of the first image.

In operation S320, the device 100 may respectively determine some pixels (i.e., first pixels) of the second image, which are respectively determined to correspond to pixels of the first image, e.g., based on the depth information of the first image generated as a result of the rendering of the first image, and may perform reprojection to respectively project or predict the color and/depth values of such first pixels so that the eventual rendering of the second image may only need to be performed for the remaining pixels of the second image, as only an example. According to an embodiment, the reprojection may include a process of generating and populating an occlusion map and a color buffer of the second image, e.g., based on the depth information and the color information of the first image. Also, the reprojection may include a process of generating and populating a depth buffer of the second image and a color buffer of the second image, based on the depth information and the color information of the first image.

According to an embodiment, the device 100 may perform reprojection to generate an occlusion map. In other words, the device 100 may determine the first pixels of the second image that correspond to pixels of the first image, e.g., based on the depth information of the first image or through other correlating processes, and generate an occlusion map that distinguishes the first pixels of the second image from some other or remaining pixels (i.e., second pixels) of the second image.

Also, based on the color buffer of the first image, e.g., resulting from the rendering of the first image, the device 100 may determine or set respective color values for each of the first pixels of the second image to have a same or matching color value as the determined corresponding pixel of the first image and may determine or set the color value of each of the second pixels of the second image to be an arbitrary value, e.g., a same arbitrary value, to collectively generate a color buffer of the first and second pixels of the second image. Furthermore, the device 100 may generate the occlusion map, which distinguishes the first pixels of the second image from the second pixels of the second image, by identifying in the occlusion mapping either of the first or second pixels of the second image, e.g., mapping the second pixels based on their determined same arbitrary color value, in the determined color buffer of the second image based on the rendering of the first image.

The device 100 may store the generated occlusion map and the color buffer of the second image in an internal memory.

According to an embodiment, the device 100 may perform reprojection and may determine or set respective depth values of each of the first pixels of the second image to be the same or match the depth value of the determined corresponding pixel of the first image and determine or set the depth value of each of the second pixels of the second image to be a predetermined value, e.g., a same predetermined value, to generate a depth buffer of the first and second pixels of the second image. Likewise, the device 100 may determine or set respective color values of each of the first pixels of the second image to be a same or matching color value of the determined corresponding pixel of the first image and may determine or set the color value of each of the second pixels of the second image to be an arbitrary value, e.g., the same arbitrary value, to generate a color buffer of the first and second pixels of the second image. As noted above, in an embodiment, the generating of the color buffer of the second image may be generated and populated, based on rendering results of the first image, before the rending of the second image.

The device 100 may store the generated depth buffer of the second image or the generated color buffer of the second image in an internal memory.

In operation S330, the device 100 may render the second image by selectively rendering the second image by rendering the second pixels of the second image, based on the reprojection.

According to an embodiment, the device 100 may select and render the second pixels of the second image, which have previously been determined to not correspond to pixels of the first image, based on the occlusion map. Since, in the occlusion map, the first pixels of the second image corresponding to pixels of the first image are distinguished from the second pixels of the second image, which do not correspond to pixels of the first image, the device 100 may not perform rasterization on the first pixels of the second image and perform rasterization on the second pixels of the second image, according to the occlusion map. In addition to the rasterization, the device 100 may perform an additional calculation, such as pixel shading, on the second pixels of the second image and consequently calculate a color value of each of the second pixels of the second image. Accordingly, the device 100 may modify a previously generated color buffer of the second image through a color value of each of the second pixels of the second image. In other words, the device 100 may change the previously determined arbitrary value in the color buffer of the second image to a respective rendered color value of each of the second pixels of the second image, which are calculated as a result of the rendering of the second image.

Accordingly, the device 100 may complete a color buffer of the second image by not performing rendering on all pixels of the second image but selecting and rendering the second pixels of the second image, which do not correspond to pixels of the first image. According to an embodiment, the device 100 may output the second image through the completed color buffer of the second image.

According to an embodiment, the device 100 may perform selective rendering on pixels of the second image based on a depth buffer of the second image. According to an embodiment, the device 100 may select and render the second pixels of the second image, which do not correspond to pixels of the first image, based on the depth buffer of the second image. According to an embodiment, the device 100 may perform a Z-test (i.e. depth test) on the first pixels of the second image, which correspond to pixels of the first image, and the second pixels of the second image, which do not correspond to pixels of the first image, by using the depth buffer of the second image. In the depth buffer of the second image, the first pixels of the second image have depth values of pixels of the first image and thus may not pass the Z-test. As a result, the device 100 does not perform calculation on the first pixels of the second image in a process after the Z-test. Also, in the depth buffer of the second image, the second pixels of the second image have a predetermined value such as an initial value and thus may pass the Z-test. Thus, the device 100 may perform calculation on the second pixels of the second image in a process after the Z-test. According to an embodiment, the device 100 may perform pixel shading on the second pixels of the second image, which have passed the Z-test, and as a result, the device 100 may calculate a color value of each of the second pixels of the second image. Accordingly, the device 100 may modify a previously generated color buffer of the second image through a color value of each of the second pixels of the second image. In other words, the device 100 may change an arbitrary value determined in a color buffer of the second image to a color value of each of the second pixels of the second image, which is calculated as a result of rendering.

Accordingly, the device 100 may complete a color buffer of the second image by not performing rendering on all pixels of the second image, but rather, by selecting and rendering only those pixels of the second image that have been determined to not correspond to pixels of the first image or whose color value has not been already determined or set based on a color pixel value of a pixel of the first image resulting from a rendering of the first image. According to an embodiment, the device 100 may output the second image through the completed color buffer of the second image.

Figure 4:
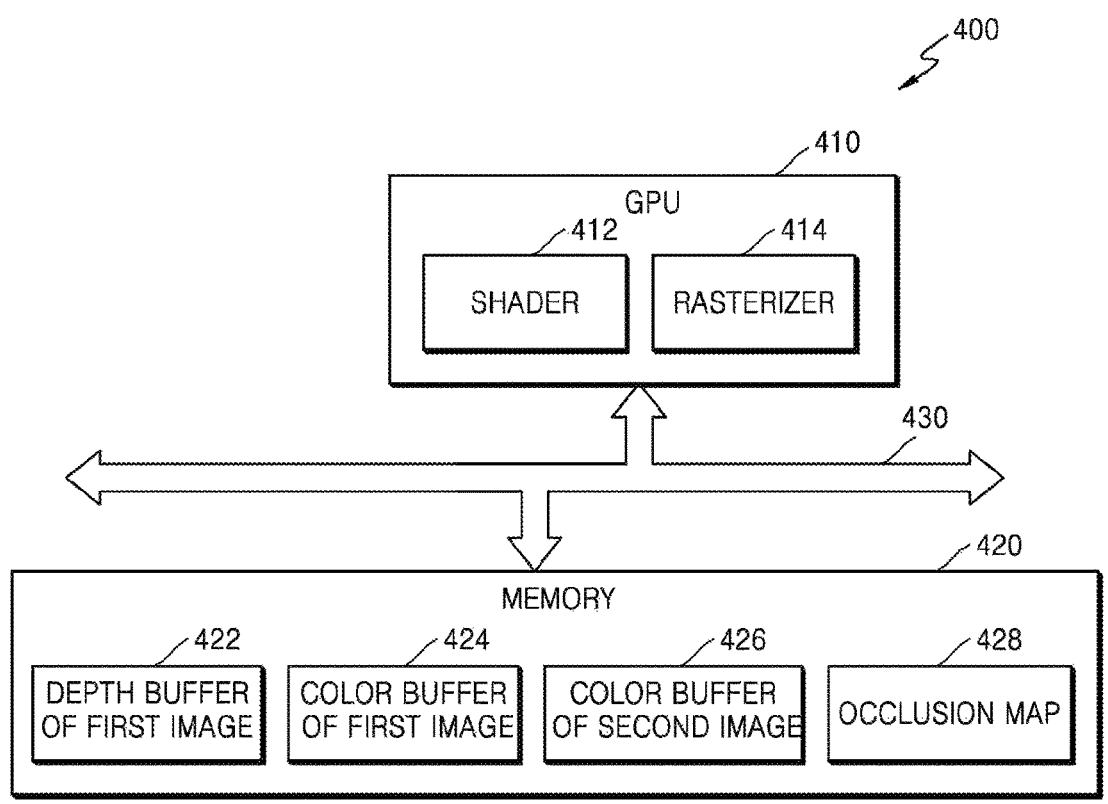
FIG. 4 is a block diagram of a device, according to one or more embodiments.

FIG. 4 is a block diagram of a device 400, according to one or more embodiments.

Referring to FIG. 4, the device 400 may include a GPU 410, a memory 420, and a bus 430, for example, noting that elements in addition to the illustrated elements may be further included.

According to an embodiment, the GPU 410 may perform rendering on a first image. According to an embodiment, the GPU 410 may perform rendering on the first image to generate a depth buffer 422 of the first image. The depth buffer 422 of the first image may include respective depth values of each of the pixels of the first image. Also, according to an embodiment, the GPU 410 may perform rendering on the first image to generate a color buffer 424 of the first image. The color buffer 424 of the first image may include respective color values of each of the pixels of the first image.

According to an embodiment, the memory 420 may store the depth buffer 422 of the first image, which is generated as a result of rendering performed on the first image. Also, according to an embodiment, the memory 420 may store the color buffer 424 of the first image, which is generated as a result of rendering performed on the first image.

According to an embodiment, the GPU 410 may include a shader 412 and a rasterizer 414, for example, noting that elements in addition to the illustrated shader 412 and rasterizer 414 may be further included.

According to an embodiment, the shader 412 may determine which pixels (i.e., first pixels) of a second image correspond to pixels of the first image, e.g., based on the depth buffer 422 of the first image stored in the memory 420. Also, the shader 412 may generate an occlusion map 428, based on the rendering of the first image that distinguishes the determined first pixels of the second image from other or remaining pixels (i.e., second pixels) of the second image. According to an embodiment, to generate the occlusion map 428, the shader 412 may set corresponding mappings for the first pixels of the second image in the occlusion map 422 to a value of "0" and set corresponding mappings for the second pixels of the second image in the occlusion map to a value of "1". The value of "0" or the value of "1" is only an example, and the occlusion map 428 may include a value other than the value of "0" or the value of "1", or other identifying information to distinguish between such example first and second pixels of the second image.

Based on the color buffer 422 of the first image, the shader 412 may determine a color value of each of the first pixels of the second image to be a color value of each of the pixels of the first image and determine a color value of each of the second pixels of the second image to be an arbitrary value, to generate the color buffer 426 of the second image. The arbitrary value may be a value previously determined by a user. Furthermore, the shader 412 may generate the occlusion map 428, which distinguishes the first pixels of the second image from the second pixels of the second image, by identifying the second pixels of the second image, determined to be the arbitrary value, based on the color buffer 426 of the second image.

Figure 5:
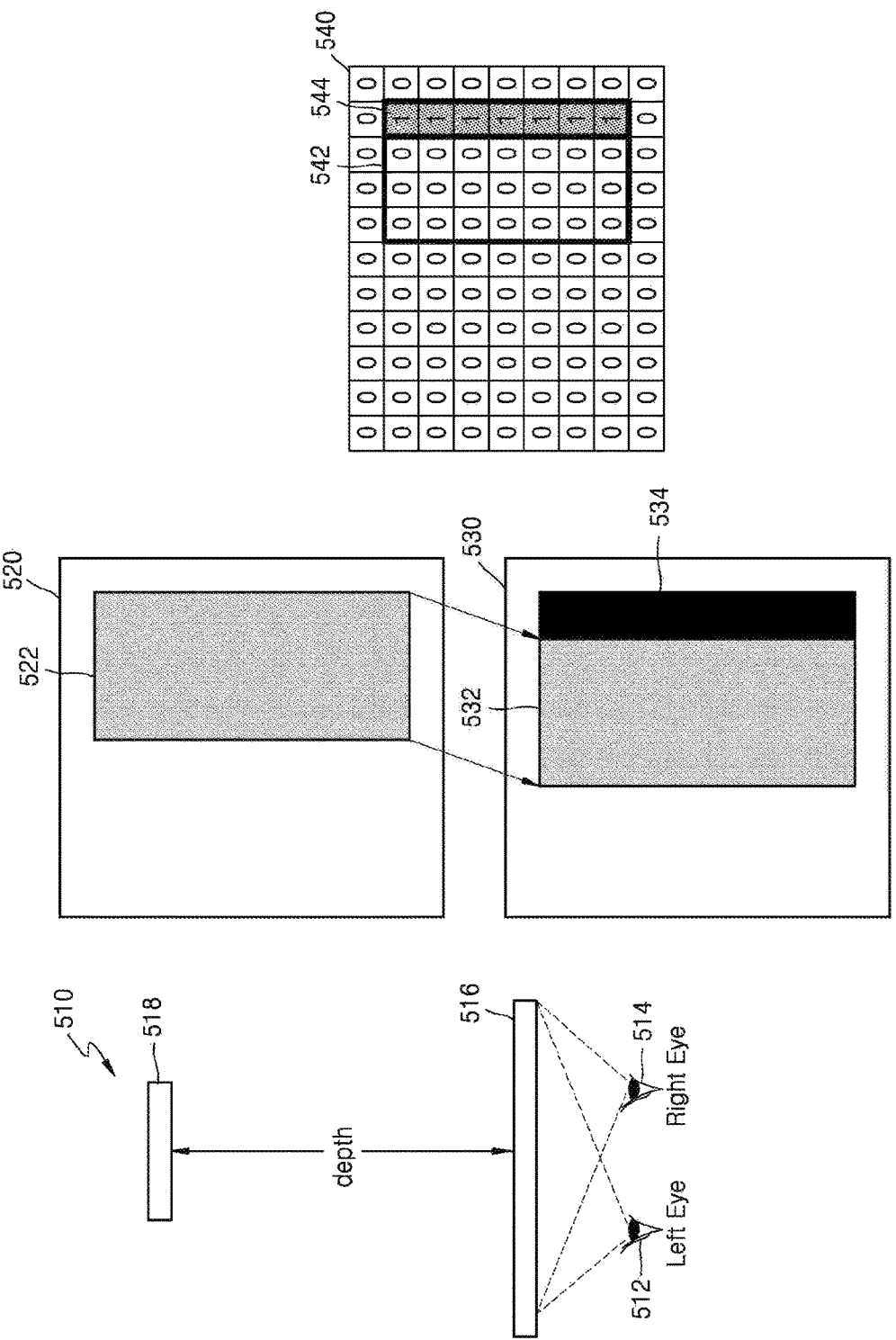
FIG. 5 illustrates an example in which a shader generates an occlusion map, according to one or more embodiments.

FIG. 5 illustrates a method by which the shader 412, as only an example, may generate an occlusion map, according to one or more embodiments.

A left part (an area indicated by a reference numeral 510) of FIG. 5 illustrates an operation of viewing an object 518 through a screen 516 at a first viewpoint 512 and a second viewpoint 514. Accordingly, the GPU 410 may perform rendering on a binocular or viewpoint disparity image based on each of the first and second viewpoints 512 and 514.

According to an embodiment, the GPU 410 may perform rendering on a first image 520 based on the first viewpoint 512. Accordingly, the GPU 410 may perform rendering on the first image 520 to generate a depth buffer or color buffer of the first image 520 indicating the object 518. In other words, the GPU 410 may calculate a depth value and a color value of each of pixels 522 indicating the object 518.

The shader 412 may perform reprojection based on the depth buffer of the first image 520. In other words, the shader 412 may respectively determine some pixels (i.e., first pixels) 532 of a second image 530, which correspond to the pixels 522, based on depth values of the pixels 522. Accordingly, the shader 412 may generate an occlusion map 540 that distinguishes the first pixels 532 of the second image 530, which correspond to the pixels 522, from some other or remaining pixels (i.e., second pixels) 534 of the second image 530, which do not correspond to the pixels 522. According to an embodiment, the shader 412 may set a value of "0" to pixels 542 placed in the same positions as the first pixels 532 of the second image 530 and set a value of "1" to pixels 544 placed in the same positions as the second pixels 534 of the second image 530, to generate the occlusion map 540.

Based on a color buffer of the first image 520, the shader 412 may determine a color value of each of the first pixels 532 of the second image 530 to be a color value of each of the pixels 522 of the first image 520 and determine a color value of each of the second pixels 534 of the second image 530 to be an arbitrary value, to generate a color buffer of the second image 530. Furthermore, the shader 412 may generate the occlusion map 540, which distinguishes the first pixels 532 of the second image 530 from the second pixels 534 of the second image 530, by identifying the second pixels 534 of the second image 530, determined to be the arbitrary value, based on the color buffer of the second image 530.

The memory 120 of FIG. 4 may store the occlusion map 428 generated by the shader 412 or the color buffer 426 of the second image 530.

According to an embodiment, the GPU 410 may perform selective rendering on pixels of the second image 530 based on the occlusion map 428 or the color buffer 426 of the second image 530, stored in the memory 420. According to an embodiment, the GPU 410 may select the second pixels of the second image 530, which do not correspond to pixels of the first image 520, to perform rendering on the selected pixels, based on the occlusion map 428 stored in the memory 420. In more detail, since, in the occlusion map 428, the first pixels of the second image 530 corresponding to the pixels of the first image 520 are distinguished from the second pixels of the second image 530, which do not correspond to the pixels of the first image 520, the rasterizer 414 may not perform rasterization on the first pixels of the second image 530 and perform rasterization on the second pixels of the second image 530, according to the occlusion map 428.

FIG. 6 illustrates a method by which the rasterizer 414, as only an example, may perform rasterization based on an occlusion map 620, according to one or more embodiments.

According to an embodiment, a first region 612 including some pixels (i.e., first pixels) 611 of a second image 610, which correspond to pixels of the first image 520 of FIG. 5, may be input to the rasterizer 414. The rasterizer 414 may omit performing rasterization on pixels 615 corresponding to the first region 612, based on the occlusion map 620. In other words, since, in the occlusion map 620, the pixels 615 corresponding to the first region 612 are set to a value of "0", the rasterizer 414 may omit performing rasterization on the pixels 615. Likewise, the rasterizer 414 may omit performing rasterization on pixels corresponding to a second region 613 including some of the first pixels 611 of the second image 610, based on the occlusion map 620. Since, in the occlusion map 620, some other or remaining pixels (i.e., second pixels) 614 of the second image 610, which do not correspond to pixels of the first image 520, are set to a value of "1", the rasterizer 414 may perform rasterization on the second pixels 614.

In addition to the performing rasterization on the second pixels of the second image 610, the GPU 410 of FIG. 4 may perform an additional calculation, such as pixel shading, on the second pixels of the second image 610 and consequently calculate a color value of each of the second pixels of the second image 610. Accordingly, the GPU 410 may read a color buffer of the second image 610, previously stored in the memory 120, and modify the read color buffer of the second image 610 through the calculated color value of each of the second pixels of the second image. In other words, the GPU 110 may change an arbitrary value determined in the color buffer of the second image 610 to the respectively calculated color value of each of the second pixels of the second image 610, which are calculated as a result of rendering.

Accordingly, the GPU 410 may complete a color buffer of the second image 610 by not performing rendering on all pixels of the second image 610 but selecting and rendering the second pixels of the second image 610, which do not correspond to pixels of the first image 520. According to an embodiment, the device 400 may output the second image 610 through the completed color buffer of the second image 610.

Figure 7:
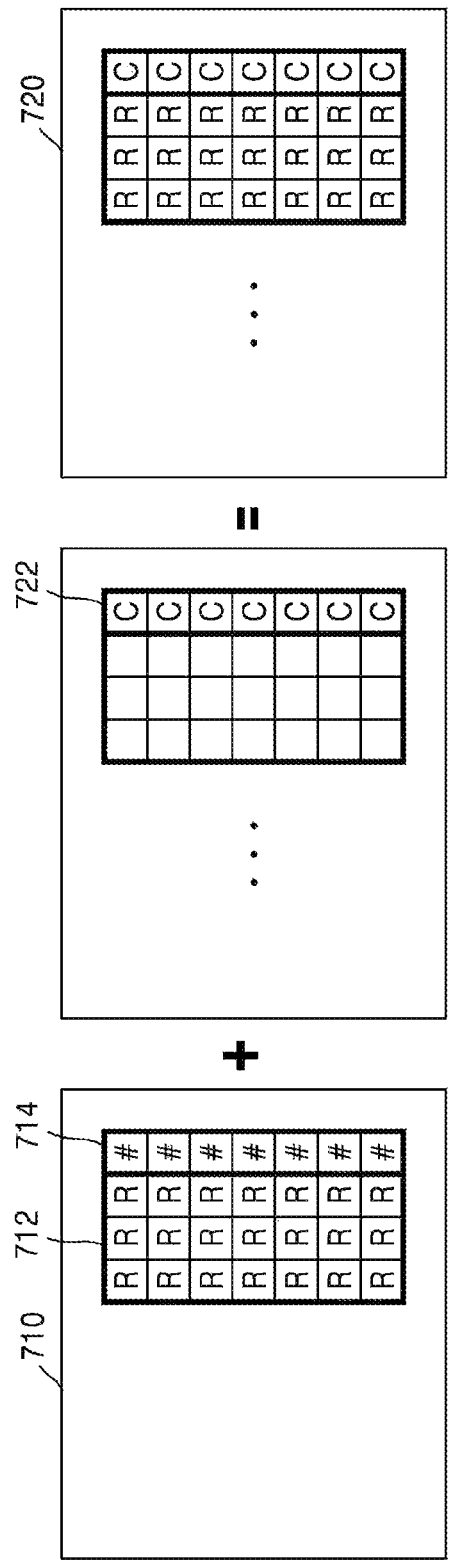
FIG. 7 illustrates an example in which a graphics processing unit (GPU) modifies a color buffer of a second image, according to one or more embodiments.

FIG. 7 illustrates a method by which the GPU 410, as only an example, may modify a color buffer of a second image, according to one or more embodiments.

According to an embodiment, the shader 412 may determine some pixels (i.e., first pixels) 712 of a second image, which correspond to pixels of a first image. Based on a color buffer of the first image, the shader 412 may determine a color value of each of the first pixels 712 of the second image to be a color value of each of the pixels of the first image and determine a color value of each of some other or remaining pixels (i.e., second pixels) 714 of the second image to be an arbitrary value, to generate a color buffer 710 of the second image. In the color buffer 710 of the second image of FIG. 7, the color value of each of the first pixels 712 is determined to be a respective "R" and the color value of each of the second pixels 714 is determined to be a respective, or the same, "#". However, the color values are not limited to the respective R value or the # value. In addition, in FIG. 7, although the color values of the first pixels 712 are represented as a variable R for the convenience of explanation, the respective color values of the first pixels 712 may have different values. Also for convenience, the color buffer 710 has been illustrated to demonstrate which of the color values represents which pixel of the second image, e.g., with the reference line for the first pixels 712 indicating which pixel values of the color buffer 710 represent the respective pixel values for the first pixels 712, and which pixel values of the color buffer 710 represent the respective pixel values for the second pixels 714.

According to an embodiment, the rasterizer 414 may select some pixels (i.e., second pixels) 722 of the second image to perform rendering, based on the occlusion map 428. In FIG. 7, the positions of the second pixels 714 of the second image, shown on the color buffer 710 of the second image, are the same as those of the second pixels 722 of the second image. Here, the rasterizer may only select the second pixels 722 for rendering, e.g., for provision to the shader 412, and not select or provide the first pixels 712 for rendering, e.g., by not providing the first pixels 712 to the shader 412 or by only providing the second pixels identified in the occlusion map 428 to the shader 412, as only examples.

According to an embodiment, the GPU 410 may perform an additional calculation, such as pixel shading, on the second pixels 722 in addition to the rasterization for the second pixels 722 of the second image, and thus may calculate a color value of each of the second pixels 722. In FIG. 7, a respectively calculated color value of each of the second pixels 722 of the second image is represented by "C". In addition, although the color values of the second pixels 722 are all represented by "C" for the convenience of explanation, the color values of the second pixels 722 may have different values.

Accordingly, the GPU 410 may determine the color value of each of the second pixels 714, which was determined to be an arbitrary value # in the color buffer 710 of the second image, to be C, which is the respectively calculated color value of each of the second pixels 722, calculated through rendering, to generate a completed color buffer 720 of the second image.

According to an embodiment, the shader 412 of FIG. 4 may set a first pixel group including the second pixels of the second image to a predetermined value to generate an expanded occlusion map. In other words, the shader 412 may generate an expanded occlusion map by setting the occlusion map 428 so that a first pixel group including the second pixels of the second image has a value which the second pixels of the second image have in the occlusion map 428. Accordingly, the first pixel group may include the second pixels of the second image and a second pixel group including pixels other than the second pixels of the second image.

Figure 8:
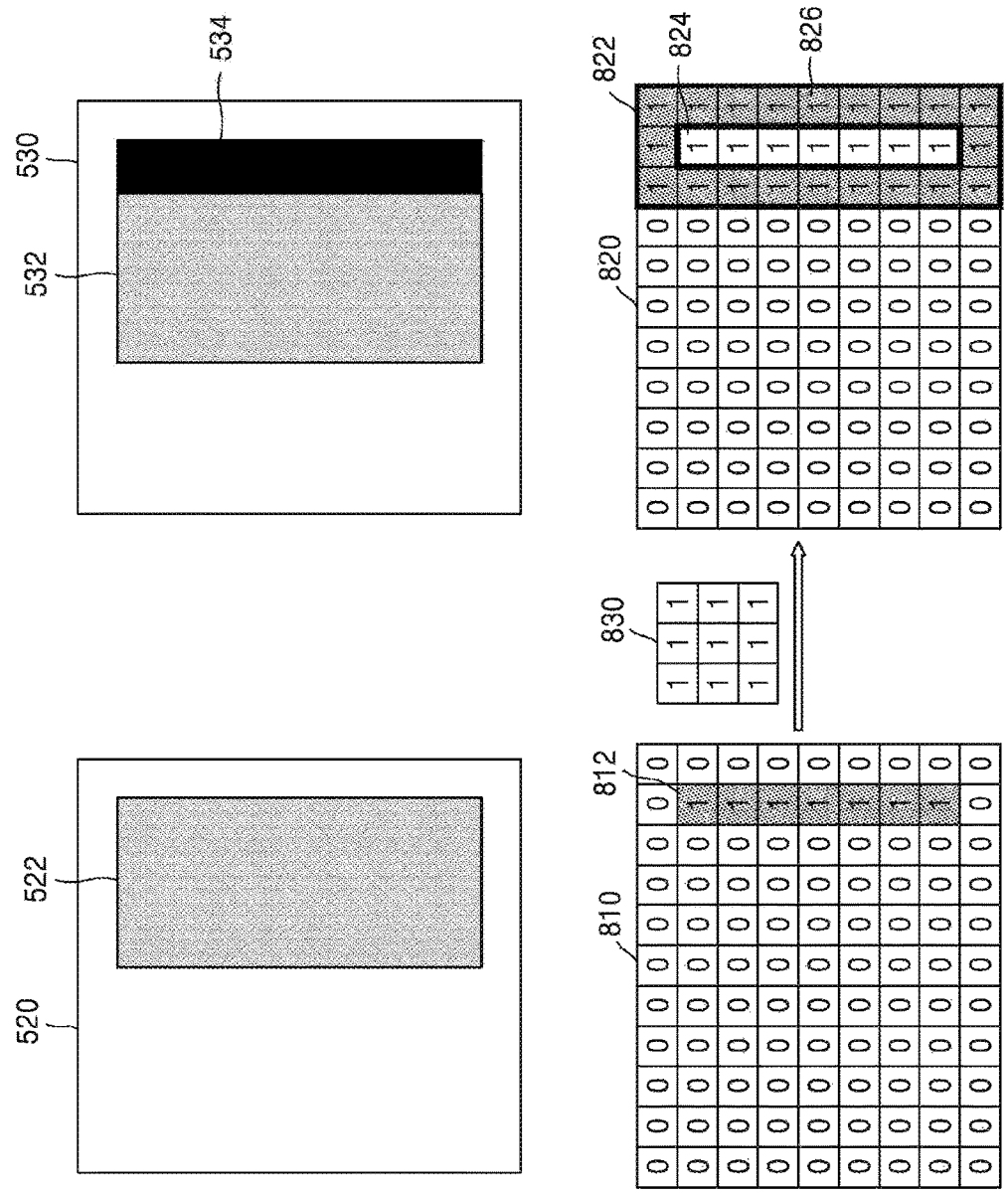
FIG. 8 is an example in which a shader expands an occlusion map, according to one or more embodiments.

FIG. 8 is a method by which the shader 412, as only an example, may expand an occlusion map, according to one or more embodiments.

The shader 412 may generate an expanded occlusion map 820 as well as an occlusion map 810. In other words, the shader 412 may give a value of "1" to pixels 812, which are in the same positions as the second pixels 534 of the second image 530, to generate the occlusion map 810. Also, the shader 412 may give a value of "1" to a first pixel group 822, which includes pixels having a wider range than the second pixels 534 of the second image 530, to generate the expanded occlusion map 820. The first pixel group 822 may include the second pixels 824 of the second image 530 and a second pixel group 826 including pixels other than the second pixels 824. For example, the shader 412 may give a value of "1" to pixels included in a 3×3 pixel range 830, based on pixels 812 that are in the same positions as the second pixels 534 of the second image 530, to generate the expanded occlusion map 820.

According to an embodiment, when rendering the second image, in addition to the second pixels of the second image, the GPU 410 of FIG. 4 may select and render the first pixel group, which also includes pixels having a wider range than the second pixels of the second image, based on an expanded occlusion map. In other words, the rasterizer 414 may select and rasterize the first pixel group of the second image based on the expanded occlusion map. Here, the pixels of the first pixel group having the wider range than the second pixels of the second image may include some of the first pixels of the second image that have corresponding pixels in the first image. In addition to the rasterization, the GPU 410 may perform an additional calculation, such as pixel shading, on the first pixel group of the second image and consequently calculate respective color values for each of pixels forming the first pixel group of the second image. Since the first pixel group of the second image includes the second pixels of the second image, the GPU 410 may change the corresponding arbitrary value determined in the color buffer 426 of the second image, previously stored in the memory 420, to the respectively calculated color value of the second pixels of the second image, which is calculated as a result of rendering. In addition, the GPU 410 may change the previously determined or set color value corresponding to the pixels of the second pixel group, determined in the color buffer 426, based on a color value of each of pixels forming the second pixel group, calculated as a result of rendering, and the previously determined or set color value corresponding to the second pixel group, in the previously determined color buffer 426. For example, the GPU 410 may calculate the average of a color value of each of the pixels of the second pixel group, calculated as a result of rendering, and a color value corresponding to the second pixel group, previously determined or set in the color buffer 426 and based on the rendering of the first image, and may change the color value corresponding to the second pixel group in the color buffer 426 to the calculated average. A more detailed embodiment is described with reference to FIG. 9.

Figure 9:
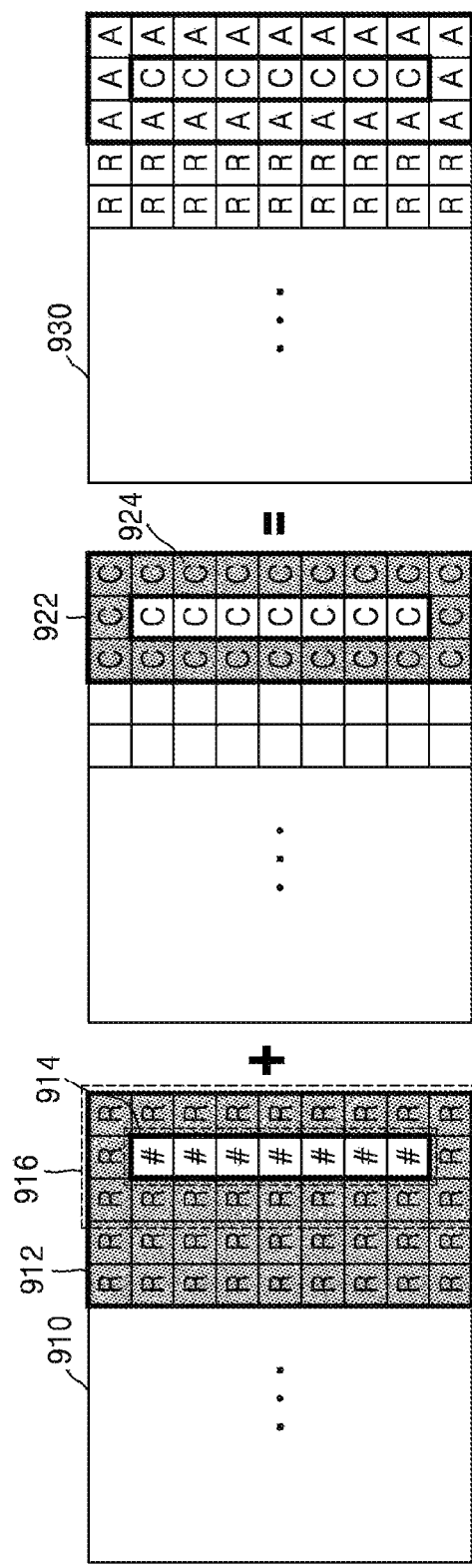
FIG. 9 illustrates an example in which a GPU modifies a color buffer of a second image based on an expanded occlusion map, according to one or more embodiments.

FIG. 9 illustrates a method by which the GPU 410, as only an example, may modify a previously determined or set color buffer of a second image based on an expanded occlusion map, according to one or more embodiments.

According to an embodiment, the shader 412 may determine the first pixels 912 of a second image, which correspond to pixels of a first image. Further, based on a color buffer of the first image, the shader 412 may determine a color value of each of the first pixels 912 of the second image to be a color value of each of the pixels of the first image and determine a color value of each of the second pixels 914 of the second image to be an arbitrary value, to generate a color buffer 910 of the second image. In the color buffer 910 of the second image of FIG. 9, the color value of each of the first pixels 912 is determined to be R and the color value of each of the second pixels 914 is determined to be #. However, the color values are not limited to R or #. In addition, in FIG. 9, although the color values of the first pixels 912 are represented as R for the convenience of explanation, the color values of the first pixels 912 may have different values.

According to an embodiment, the rasterizer 414 may select a first pixel group 922 of the second image to also perform rasterization, based on an expanded occlusion map.

According to an embodiment, the GPU 410 may perform an additional calculation, such as pixel shading, on the first pixel group 922 in addition to the rasterization for the first pixel group 922, and thus may calculate respective color values for each of the pixels of the first pixel group 922. In FIG. 9, a calculated color value of each of the pixels of the first pixel group 922 is C, but is not limited to C. In addition, although the color values of the pixels of the first pixel group 922 are represented as C for the convenience of explanation, the color values of the pixels of the first pixel group 922 may have different values.

Accordingly, the GPU 410 may change previously determined or set color values of each of the second pixels 914, which were determined to be an arbitrary value # in the color buffer 910 of the second image, to C which is the respective calculated color value calculated through rendering. In addition, the respective previously determined or set color value R of each of the pixels of the second pixel group 924 may be changed to a respective "A" based on the respective C, the respective A being a calculated color value of each of the pixels of the second pixel group 924, calculated as a result of rendering, and based on the respective previously determined or set R color value of a pixel group 916 of the color buffer 910, which corresponds to pixels being in the same position as the second pixel group 924, and thus, a completed color buffer 930 of the second image may be obtained. For example, the GPU 10 may calculate the respective average A of the respective color value R and the respective color value C and change the color value of the pixel group 916 from C to the average value A. In FIG. 9, although the changed color values are represented as A for the convenience of explanation, the color values may have different values.

Figure 10:
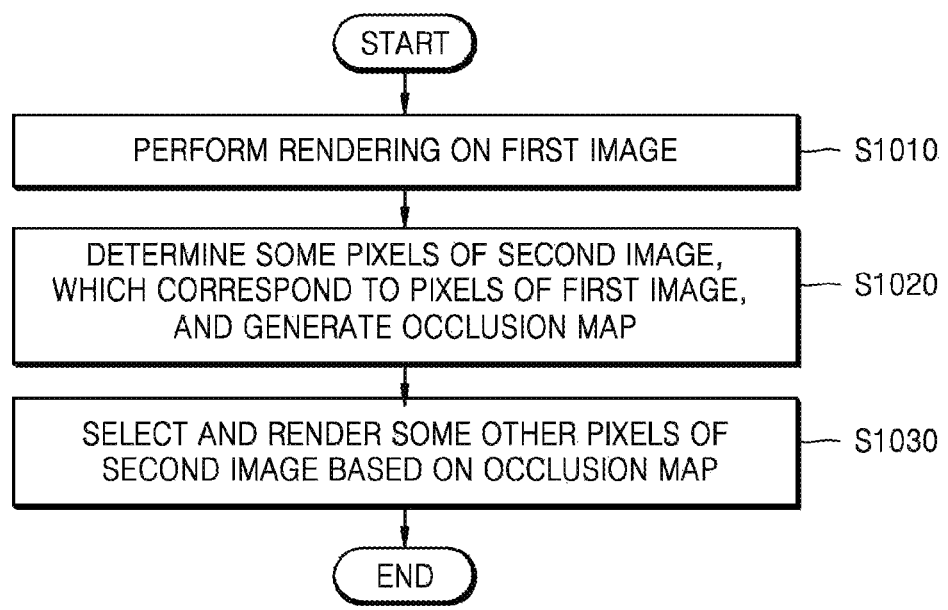
FIG. 10 is a flowchart illustrating a method by which a device performs rendering on first and second images having binocular or viewpoint disparity, according to one or more embodiments.

FIG. 10 is a flowchart illustrating a method by which the device 400, as only an example, may perform rendering on first and second images having binocular or viewpoint disparity, according to one or more embodiments.

In this example, as the method illustrated in FIG. 10 is being explained through operations of the device 400 of FIG. 4, again as only an example, repeated descriptions regarding operations of device 400 are omitted.

In operation S1010, the device 400 may perform rendering on the first image. According to an embodiment, the device 400 may perform rendering on the first image to generate a depth buffer of the first image. Also, according to an embodiment, the device 400 may perform rendering on the first image to generate a color buffer of the first image. The device 400 may store the depth buffer and the color buffer of the first image in an internal memory.

In operation S1020, the device 400 may respectively determine first pixels of a second image, which correspond to pixels of a first image, based on the depth buffer of the first image, and may generate an occlusion map. In other words, the device 400 may determine some pixels (i.e., first pixels) of the second image, which correspond to pixels of the first image, e.g., based on the depth buffer of the first image, to generate an occlusion map that distinguishes the first pixels of the second image from some other or remaining pixels (i.e., second pixels) of the second image. According to an embodiment, the device 400 may set the first pixels of the second image to a value of "0" and set the second pixels of the second image to a value of "1" in a generated occlusion map, to distinguish between the first and second pixels of the second image. However, the value of "0" or the value of "1" is only an example, and the occlusion map may include a value other than the value of "0" or the value of "1".

Also, according to an embodiment, the device 400 may determine a color value of each of the first pixels of the second image to be a color value of each of the pixels of the first image and determine a color value of each of the second pixels of the second image to be an arbitrary value, based on a color buffer of the first image, to generate a color buffer of the second image. Furthermore, the device 400 may generate the occlusion map by identifying the second pixels of the second image, determined to be the arbitrary value, from on the color buffer of the second image.

According to an embodiment, the device 400 may store the generated occlusion map or the color buffer of the second image in an internal memory.

In operation S1030, the device 400 may select and render the second pixels of the second image based on the occlusion map. In other words, the device 400 may select and render the second pixels of the second image, which do not correspond to pixels of the first image, based on the occlusion map. In more detail, since, in the occlusion map, the first pixels of the second image corresponding to pixels of the first image are distinguished from the second pixels of the second image which do not correspond to the pixels of the first image, the device 400 may not perform rasterization on the first pixels of the second image and perform rasterization on the second pixels of the second image, according to the occlusion map.

In addition to the rasterization for the second pixels of the second image, the device 400 may perform an additional calculation, such as pixel shading, on the second pixels of the second image and consequently calculate respective color values for each of the second pixels of the second image. Accordingly, the device 400 may modify the previously generated color buffer of the second image having previously determined or set color values for the second pixels of the second image based on the newly calculated respective color values of each of the second pixels of the second image. In other words, the device 400 may change the previously determined or set arbitrary value, determined in the color buffer of the second image, e.g., based on the rendering of the first image, to the respectively calculated color value of each of the second pixels of the second image, resulting from the rendering of the second image.

Accordingly, the device 400 may complete a color buffer of the second image by not performing rendering on all pixels of the second image but selecting and rendering the second pixels of the second image, which do not correspond to pixels of the first image. According to an embodiment, the device 400 may output the second image through the completed color buffer of the second image.

Figure 11:
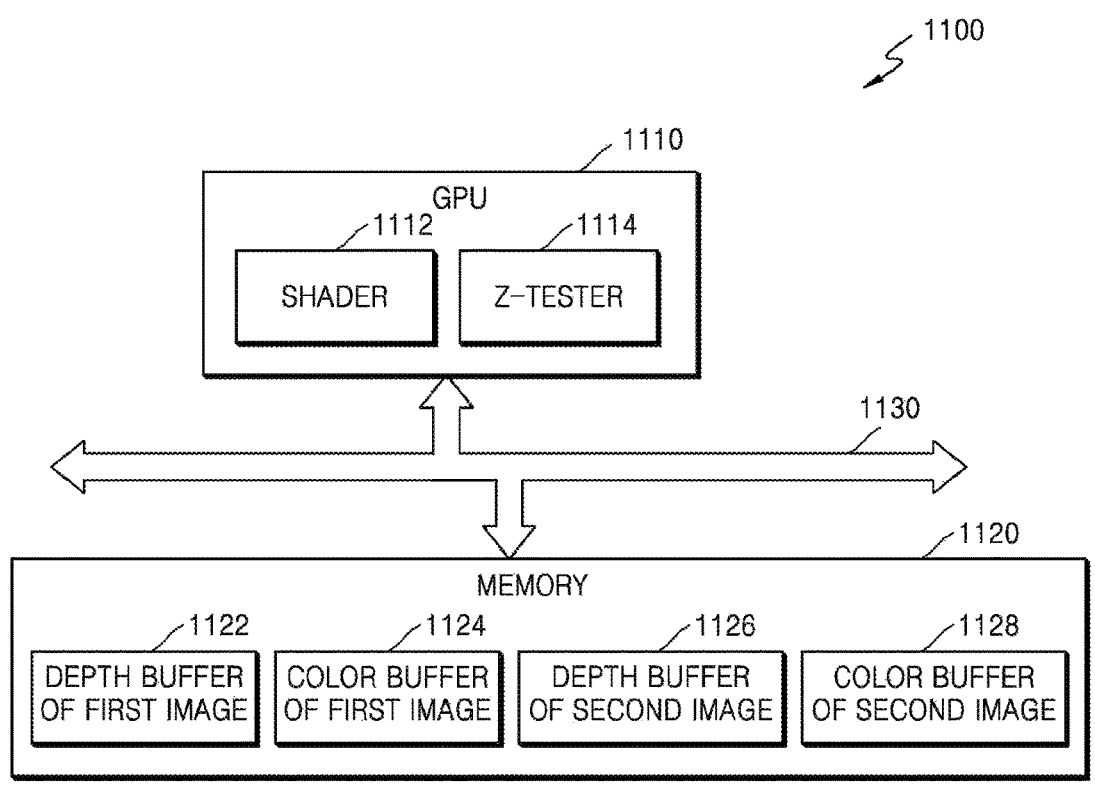
FIG. 11 is a block diagram of a device, according to one or more embodiments.

FIG. 11 is a block diagram of a device 1100, according to one or more embodiments.

Referring to FIG. 11, the device 1100 may include a GPU 1110, a memory 1120, and a bus 1130, for example, noting that elements in addition to the illustrated elements may be further included.

According to an embodiment, the GPU 1110 may perform rendering on a first image. According to an embodiment, the GPU 1110 may perform rendering on the first image to generate a depth buffer 1122 of the first image. The depth buffer 1122 of the first image may include a depth value of each of the pixels of the first image. Also, according to an embodiment, the GPU 1110 may perform rendering on the first image to generate a color buffer 1124 of the first image. The color buffer 1124 of the first image may include a color value of each of the pixels of the first image.

According to an embodiment, the memory 1120 may store the depth buffer 1122 of the first image, which is generated as a result of rendering performed on the first image. Also, according to an embodiment, the memory 1120 may store the color buffer 1124 of the first image, which is generated as a result of rendering performed on the first image.

According to an embodiment, the GPU 1110 may include a shader 1112 and a Z-tester 1114, for example, noting that elements in addition to the illustrated shader 1112 and Z-tester 1114 may be further included.

According to an embodiment, the shader 1112 may respectively determine the first pixels of a second image, which correspond to pixels of the first image, based on the depth buffer 1122 of the first image, stored in the memory 1120. Also, according to an embodiment, the shader 1112 may determine a depth value of each of the first pixels of the second image to be a depth value of each of the pixels of the first image and determine a depth value of each of the second pixels of the second image to be a predetermined value, based on the depth buffer 1122 of the first image, to generate a depth buffer 1126 of the second image. The predetermined value may be a clear value (i.e., initial value) previously set by a user.

Likewise, the shader 1112 may determine a color value of each of the first pixels of the second image to be a color value of each of the pixels of the first image and determine a color value of each of the second pixels of the second image to be an arbitrary value, based on the color buffer 1124 of the first image, to generate a color buffer 1128 of the second image. The arbitrary value may be previously set by a user.

Figure 12:
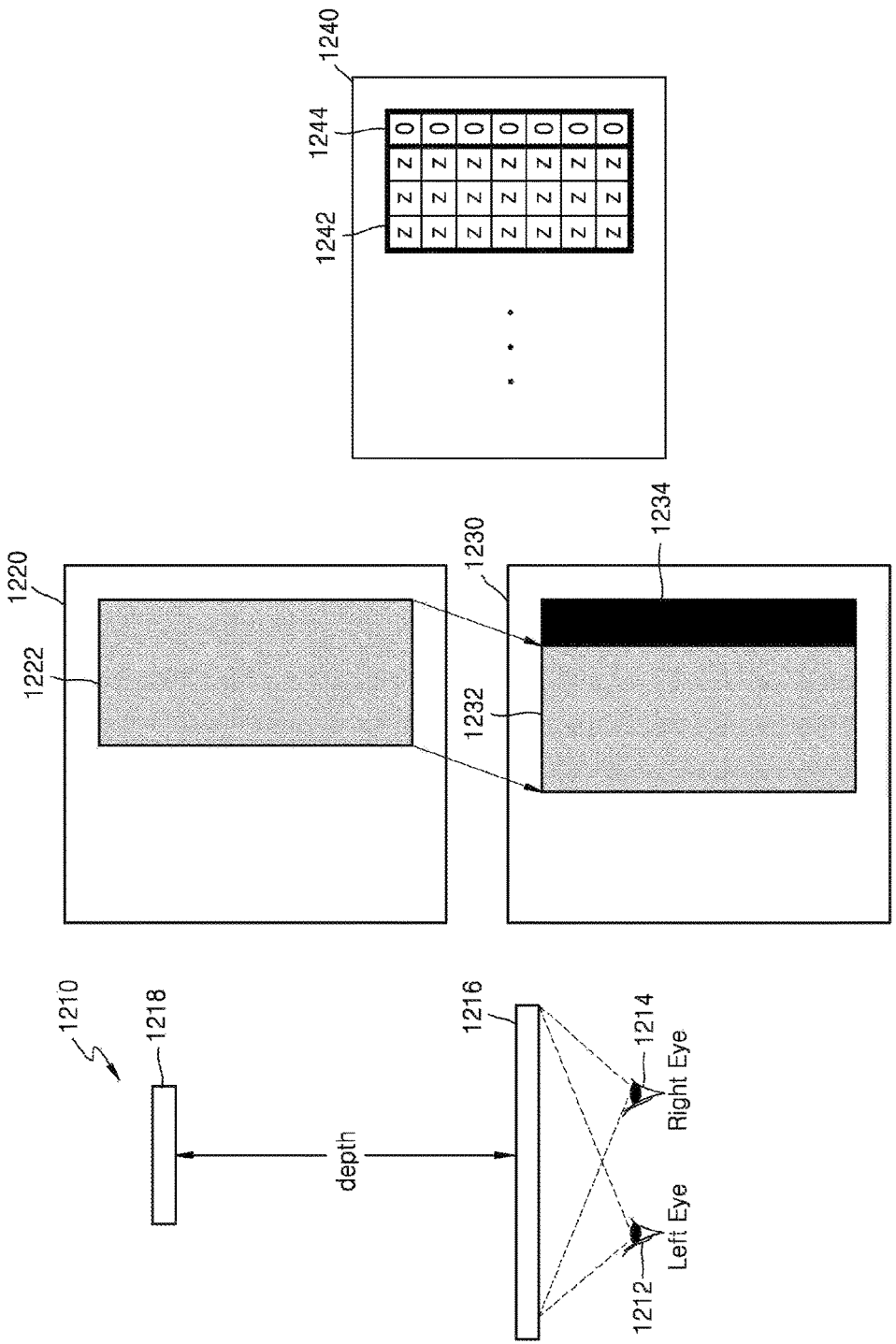
FIG. 12 illustrates an example in which a shader generates a depth buffer of a second image, according to one or more embodiments.

FIG. 12 illustrates a method by which the shader 1112, as only an example, may generate a depth buffer of a second image, according to one or more embodiments.

A left part (an area indicated by a reference numeral 1210) of FIG. 12 illustrates an operation of viewing an object 1218 through a screen 1216 at a first viewpoint 1212 and a second viewpoint 1214. Accordingly, the GPU 1110 may perform rendering on a binocular or viewpoint disparity image based on each of the first and second viewpoints 1212 and 1213.

According to an embodiment, the GPU 1110 may perform rendering on a first image 1220 based on the first viewpoint 1212. Accordingly, the GPU 1110 may perform rendering on the first image 1220 to generate a depth buffer or color buffer of the first image 1220 indicating the object 1218. In other words, the GPU 1110 may calculate a depth value and a color value of each of pixels 1222 indicating the object 1218.

The shader 1112 may perform reprojection based on a depth buffer of the first image 1220. In other words, the shader 1112 may determine the first pixels 1232 of a second image 1230, which correspond to the pixels 1222, based on depth values of the pixels 1222. Accordingly, the shader 1112 may set pixels 1242 placed in the same positions as the first pixels 1232 of the second image 1230 to a respective depth value "z" of each of the pixels 1222 of the first image 1220 and set pixels 1244 placed in the same positions as the second pixels 1234 of the second image 1230 to a value of "0", to generate a depth buffer 1240 of the second image 1230. In FIG. 12, although depth values of the first pixels 1242 are represented as "z" for the convenience of explanation, the respective depth values of the first pixels 1242 may have different values. Also, based on a color buffer of the first image 1220, the shader 1112 may determine a color value of each of the first pixels 1232 of the second image 1230 to be a color value of each of the pixels 1222 of the first image 1220 and determine a color value of each of the second pixels 1234 of the second image 1230 to be an arbitrary value, to generate a color buffer of the second image 1230.

Accordingly, according to an embodiment, the memory 1120 of FIG. 11 may populate and store the depth buffer 1126 of the second image and the color buffer 1128 of the second image based on the rendering of the first image.

According to an embodiment, the GPU 1110 may perform selective rendering on pixels of the second image, based on the depth buffer 1128 of the second image or the color buffer 1128 of the second image, stored in the memory 1120. According to an embodiment, the GPU 1110 may select and render the second pixels of the second image, which do not correspond to pixels of the first image, based on the depth buffer 1126 of the second image, stored in the memory 1120. More specifically, according to an embodiment, the Z-tester 1114 may perform a Z-test (i.e. depth test) on the first pixels of the second image, which correspond to pixels of the first image, and the second pixels of the second image, which do not correspond to pixels of the first image, by using the depth buffer 1126 of the second image, stored in the memory 1120. In the depth buffer 1126 of the second image, stored in the memory 1120, the first pixels of the second image have respective depth values of pixels of the first image and thus may not pass the Z-test. As a result, the GPU 1110 does not perform calculation on the first pixels of the second image in a process after the Z-test. Also, in the depth buffer 1126 of the second image, stored in the memory 1120, the second pixels of the second image have predetermined values that are set to pass the Z-test. Thus, the GPU 1110 may perform calculation on the second pixels of the second image in a process after the Z-test. According to an embodiment, the GPU 1110 may perform pixel shading on the second pixels of the second image, which have passed the Z-test, and as a result, the GPU 1110 may calculate a color value for each of the second pixels of the second image. Accordingly, the GPU 1110 may read the color buffer 1128 of the second image, previously stored in the memory 1120, and modify the read color buffer of the second image based on the calculated color value of each of the second pixels of the second image. In other words, the GPU 1110 may change the previously determined or set arbitrary value in the color buffer 1128 of the second image to the respectively calculated color value of each of the second pixels of the second image, which are calculated as a result of the selective rendering of the second image.

In other words, the GPU 1110 may complete or finalize the color buffer of the second image by not performing rendering on all pixels of the second image but selecting and rendering the second pixels of the second image, which do not correspond to pixels of the first image. According to an embodiment, the device 1100 may output the second image through the completed color buffer of the second image.

Figure 13:
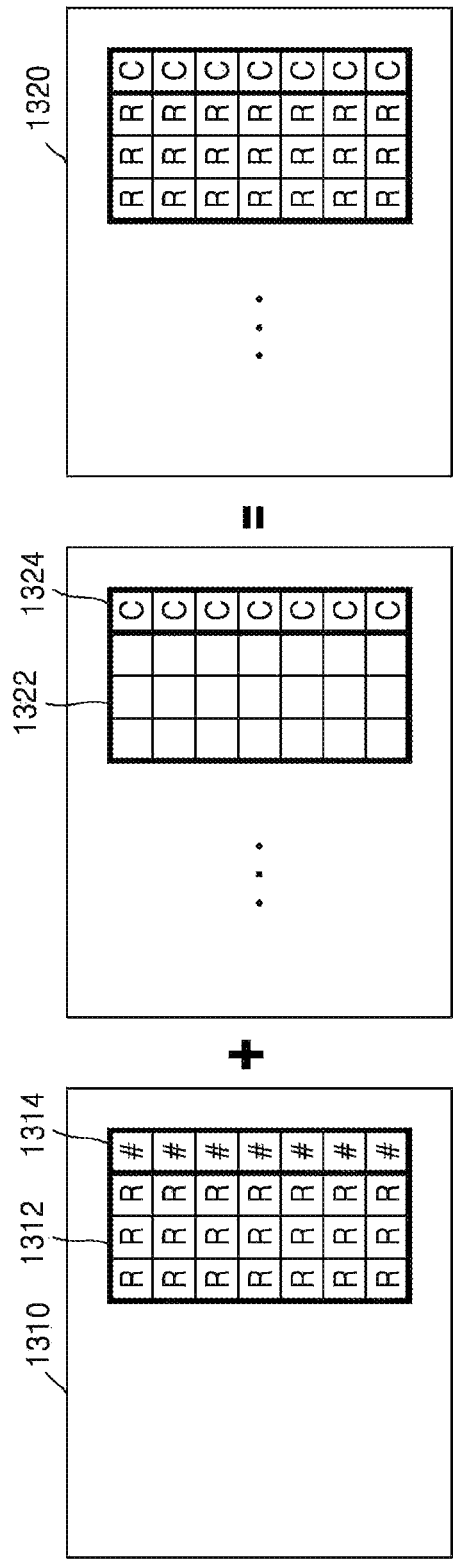
FIG. 13 illustrates an example in which a GPU modifies a color buffer of a second image, according to one or more embodiments.

FIG. 13 illustrates a method by which the GPU 1110, as only an example, may modify a color buffer of a second image, according to one or more embodiments.

According to an embodiment, the shader 1112 may determine the first pixels 1312 of a second image which correspond to pixels of a first image. Based on a color buffer of the first image, the shader 1112 may determine or set respective color values of each of the first pixels 1312 of the second image to be the same or match the color value of each of the pixels of the first image and determine or set a color value of each of the second pixels 1314 of the second image to be an arbitrary value, to generate a color buffer 1310 of the second image based on the rendering of the first image. In the color buffer 1310 of the second image of FIG. 13, the respective color value of each of the first pixels 1312 is represented by R and the color value of each of the second pixels 1314 is represented by # as an arbitrary value. However, the color values are not limited to R or #. In FIG. 13, although the color values of the first pixels 1312 are represented as R for the convenience of explanation, the color values of the first pixels 1312 may have different values.

According to an embodiment, the Z-tester 1114 may perform a Z-test for the first pixels 1322 of the second image and the second pixels 1324 of the second image, based on the previously determined or set depth buffer of the second image. In FIG. 13, the positions of the second pixels 1312 of the second image are the same as those of the second pixels 1324 of the second image. Furthermore, the GPU 1110 may perform an additional calculation, such as pixel shading, on the second pixels 1324 of the second image which have passed the Z-test, and as a result, the GPU 1110 may calculate respective color values for each of the second pixels 1324 of the second image. In FIG. 13, the respective calculated color value of each of the second pixels 1324 of the second image is represented by C. In addition, although the calculated color values of the second pixels 1324 are represented as C for the convenience of explanation, the calculated color values of the second pixels 1324 may have different values.

Accordingly, the GPU 1110 may newly determine the color value of each of the second pixels 1314, which were previously determined or set to be an arbitrary value # in the color buffer 1310 of the second image based on the rendering of the first image, to be the respectively calculated color value C calculated through rendering of the second image, to generate a completed color buffer 1320 of the second image.

Figure 14:
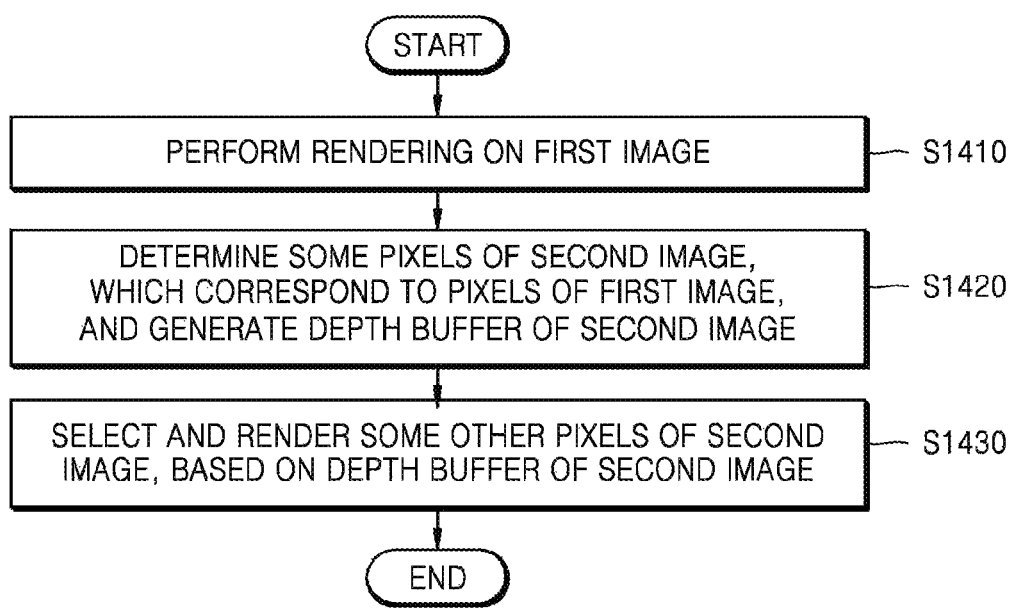
FIG. 14 is a flowchart illustrating a method by which a device performs rendering on first and second images having binocular or viewpoint disparity, according to one or more embodiments.

FIG. 14 is a flowchart illustrating a method by which the device 1100, as only an example, may perform rendering on first and second images having binocular or viewpoint disparity, according to one or more embodiments.

In this example, as the method illustrated in FIG. 14 is being explained through operations of the device 1100 of FIG. 11, again as only an example, repeated descriptions regarding operations of device 1100 are omitted.

In operation S1410, the device 1100 may perform rendering on the first image. According to an embodiment, the device 1100 may perform rendering on the first image to generate a depth buffer of the first image. Also, according to an embodiment, the device 1100 may perform rendering on the first image to generate a color buffer of the first image. The device 1100 may store the depth buffer of the first image and the color buffer of the first image in an internal memory.

In operation S1420, the device 1100 may determine the first pixels of the second image, which correspond to pixels of the first image, based on the depth buffer of the first image, and may generate a depth buffer of the second image. In other words, the device 1100 may determine a depth value of each of the first pixels of the second image to a be depth value of each of the corresponding pixels of the first image and determine a depth value of each of the second pixels of the second image to be a predetermined value, based on the depth buffer of the first image, to generate a depth buffer of the second image. The predetermined value may be a clear value (i.e., initial value) previously set by a user.

Also, the device 1100 may determine a color value of each of the first pixels of the second image to be a color value of each of the corresponding pixels of the first image and determine a color value of each of the second pixels of the second image to be an arbitrary value, based on the color buffer of the first image, to generate a color buffer of the second image. The arbitrary value may be a value previously set by a user. The device 1100 may store the depth buffer of the second image and the color buffer of the second image in an internal memory.

In operation S1430, the device 1100 may select and render the second pixels of the second image, based on the depth buffer of the second image. According to an embodiment, the device 1100 may perform a Z-test (i.e. depth test) on the first pixels of the second image, which correspond to pixels of the first image, and the second pixels of the second image, which do not correspond to pixels of the first image, by using the depth buffer of the second image. In the depth buffer of the second image, the first pixels of the second image have depth values of pixels of the first image and thus may not pass the Z-test. As a result, the device 1100 does not perform calculation on the first pixels of the second image in a process after the Z-test. Also, in the depth buffer of the second image, the second pixels of the second image have predetermined values such as an initial value and thus pass the Z-test. Thus, the device 1110 may consecutively perform calculation on the second pixels of the second image in a process after the Z-test. According to an embodiment, the device 1100 may perform pixel shading on the second pixels of the second image, which have passed the Z-test, and as a result, the device 1100 may calculate a color value of each of the second pixels of the second image. Accordingly, the device 1100 may modify a previously generated color buffer of the second image through a color value of each of the second pixels of the second image. In other words, the device may change the arbitrary value determined in a color buffer of the second image to the respectively calculated color value of each of the second pixels of the second image, which is calculated as a result of rendering of the second image.

Accordingly, the device 1100 may select and render the second pixels of the second image and change the arbitrary value determined in a previously generated color buffer of the second image to the respectively calculated color value of each of the second pixels of the second image, which are calculated as a result of rendering of the second image. In other words, the device 1100 may complete or finalize a color buffer of the second image by not performing rendering on all pixels of the second image but selecting and rendering the second pixels of the second image, which do not correspond to pixels of the first image. According to an embodiment, the device 1100 may output the second image through the completed color buffer of the second image.

Figure 15:
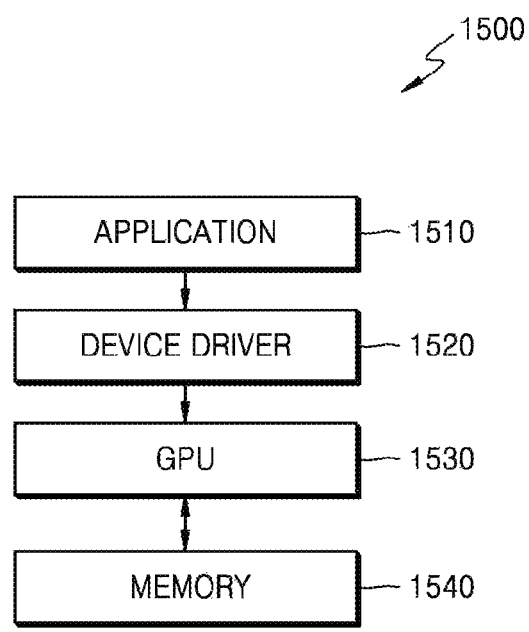
FIG. 15 is a block diagram of a device, according to one or more embodiments.

FIG. 15 is a block diagram of a device 1500, according to one or more embodiments.

The device 1500 may include an application 1510, a device driver 1520, a GPU 1530, and a memory 1540, for example, noting that elements in addition to the illustrated elements may be further included.

According to an embodiment, the application 1510 may provide information related to rendering or tile-based rendering on a binocular or viewpoint disparity image to the device driver 1520 through an application program interface (API). The application 1510 may provide information related to rendering or tile-based rendering on a binocular or viewpoint disparity image, to the device driver 1520, through an API standard such as OpenGL, OpenGL ES, or Direct 3, as only examples. In other words, the application 1510 may provide information related to rendering or tile-based rendering on a first image and a second image having binocular or viewpoint disparity, to the device driver 1520, through API to generate a binocular or viewpoint disparity image. Also, according to an embodiment, the application 1510 may explicitly provide information related to rendering or tile-based rendering on each of first and second images, to the device driver 1520, through extension of the API.

According to an embodiment, the device driver 1520 may analyze the API received from the application 1510, convert the API to a command that may be processed by the GPU 1530, and transmit the command to the GPU 1530. According to an embodiment, the device driver 1520 may transmit at least one draw command for the first and second images to the GPU 1530. The draw command is a command indicating which object is to be rendered on a predetermined image or frame. According to an embodiment, the draw command may be presented as a drawcall. For example, the draw command may be a command to draw a predetermined number of triangles and rectangles in an image or frame.

According to an embodiment, the device driver 1520 may transmit state information related to the draw command, with the draw command, to the GPU 1530. The state information indicates a state of being bound to the draw command. Also, the state information may denote information needed to render a predetermined object. For example, the state information may include texture type, camera viewpoint information, and source data like coordinate information about a predetermined object, and the state information may be presented as a state. According to an embodiment, the device driver 1520 may transmit one draw command and state information for each of the first and second images to the GPU 1530. Since the first and second images are images of the same object viewed from different viewpoints, the state information on the first and second images may be provided such that only the camera viewpoint information is differently presented for each of the first and second images and the other information may be identically presented for each of the first and second images. In other words, the device driver 1520 may transmit a pair of state information for the first and second images, with one draw command, to the GPU 1530.

According to an embodiment, the GPU 1530 may perform rendering on the first and second images having binocular or viewpoint disparity, based on the draw command and the state information about the binocular or viewpoint disparity image, received from the device driver 1520. Also, according to an embodiment, the GPU 1530 may perform tile-based rendering on the first and second images, based on the draw command and the state information about the binocular or viewpoint disparity image, received from the device driver 1520.

Additional descriptions for GPU 1530 and the memory 1540 of FIG. 15 are similar to any of the above descriptions for GPU 110 and the memory 120 of FIG. 1, the GPU 410 and the memory 420 of FIG. 4, and/or the GPU 1110 and the memory 1120 of FIG. 11, and thus, such similarly applicable repeated descriptions for the GPU 1530 and the memory 1540 are omitted here.

Figure 16:
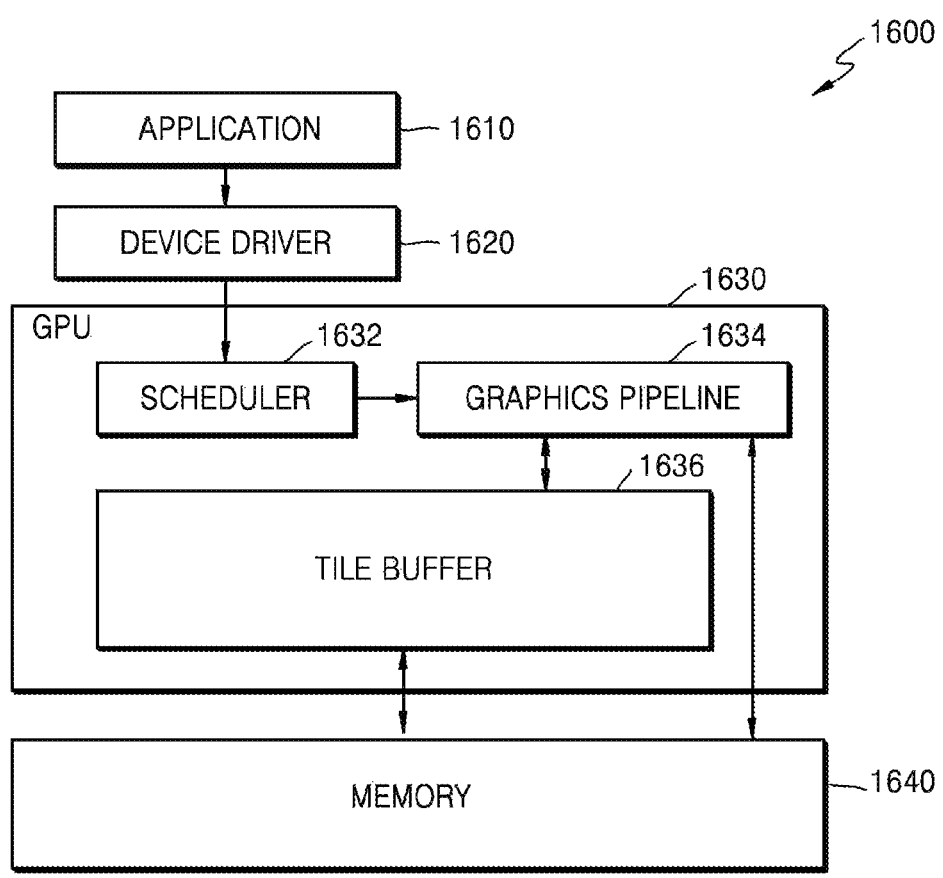
FIG. 16 is a block diagram of a device, according to one or more embodiments.

FIG. 16 is a block diagram of a device 1600, according to one or more embodiments.

The device 1600 may include an application 1610, a device driver 1620, a GPU 1630, and a memory 1640, for example, noting that elements in addition to the illustrated elements may be further included.

The GPU 1630 may perform tile-based rendering. The tile-based rendering means that each frame of an image is divided or partitioned into a plurality of tiles and rendering is performed by unit of tiles. In a tile-based architecture, the number of calculations may be decreased compared to when processing a frame by units of pixels. Thus, such a tile-based rendering may be a graphics rendering method that may be used in a relative low processing performance mobile device (or embedded device), like a smart phone or a tablet device, as only an example embodiment. Hereinafter, the expression that the GPU 1630 performs rendering is understood as meaning that the GPU 1630 performs tile-based rendering.

According to an embodiment, the GPU 1630 may include a scheduler 1632, a graphics pipeline 1634, and a tile buffer 1636, for example, noting that elements in addition to the illustrated scheduler 1632, graphics pipeline 1634, and tile buffer 1636 may be further included.

According to an embodiment, the scheduler 1632 may receive at least one draw command and state information for first and second images having binocular or viewpoint disparity from the device driver 1620.

According to an embodiment, the scheduler 1632 may divide at least one draw command into batches having a predetermined unit and sequentially assign the batches to the graphics pipeline 1634. For example, the scheduler 1632 may divide one hundred draw commands for one hundred primitives into batches, each having twenty draw commands for twenty primitives, and sequentially assign the one hundred draw commands as five batches to the graphics pipeline 1634. Also, according to an embodiment, when the scheduler 1632 assigns the batches to the graphics pipeline 1634, the scheduler 1632 may assign one batch to the graphics pipeline 1634 twice for each of the first and second images. In other words, when assigning a first batch of the batches to the graphics pipeline 1634, the scheduler 1632 may assign the first batch to the graphics pipeline 1634 for the sake of the first image, and then may assign the first batch to the graphics pipeline 1634 for the sake of the second image.

According to an embodiment, the graphics pipeline 1634 may perform tile binning on each of the first and second images depending on assigned batches. The tile binning may be a process of dividing the first and second images into a predetermined number of tiles and generating binning information that indicates whether at least one draw command is performed on each tile of the first and second images. More specifically, the tile binning is to divide each of a first frame for embodying the first image and a second frame for embodying the second image into a predetermined number of tiles. For example, when the first frame of 100×100 pixels is divided into four tiles, the size of one tile is 25×25 pixels. Accordingly, in the following description, the dividing of the first image into a predetermined number of tiles is regarded to be equivalent to dividing the first frame for embodying the first image into a predetermined number of tiles, and the expression of a tile of the first image is regarded to be the same as a tile included in the first frame for embodying the first image. Also, the tile binning may be a process of generating a tile list indicating in which tile of the first and second images vertices, primitives, or patches forming 2D or 3D objects are included. Also, the tile binning may be a process of obtaining information about the vertex or primitive included in each tile of the first and second images. An example of the information about the vertex or primitive may be information about an identifier, a position, a color, and texture of the vertex or primitive.

According to an embodiment, the graphics pipeline 1634 may perform tile binning the tile binning on each of the first and second images according to the assigned batches and the state information related to the assigned batches. According to an embodiment, the graphics pipeline 1634 may receive a first batch of the assigned batches and state information related to the first batch. Since the state information related to the first batch includes camera viewpoint information of each of the first and second images, even when the first batch is assigned only once, the graphics pipeline 1634 may perform each of tile binning for the first image and tile binning for the second image according to the first batch and the state information related to the first batch. Also, according to an embodiment, the graphics pipeline 1634 may be assigned with the first batch and the state information related to the first batch, twice, for each of the first and second images, and the graphics pipeline 1634 may perform each of the tile binning for the first image and the tile binning for the second image.

The graphics pipeline 1634 may perform tile binning to generate binning information indicating in which tile of the first and second images at least one draw command is performed. According to an embodiment, the graphics pipeline 1634 may store the binning information generated as a result of the tile binning in the tile buffer 1636 or the memory 1649.

The graphics pipeline 1634 may perform rendering on each tile of the first image based on the generated binning information.

According to an embodiment, the graphics pipeline 1634 may sequentially perform rendering on first through n-th tiles that are the tiles of the first image, and may generate a depth buffer or a color buffer of each of the first through n-th tiles. In addition, the tile buffer 1636 may temporarily store a depth buffer or color buffer of at least one of sequentially generated tiles to the extent of acceptable capacity. The temporarily stored at least one depth buffer or color buffer may be stored in the memory 1640 according to a flush command. Accordingly, the depth buffer of each of the first through n-th tiles that are the tiles of the first image may be stored, as a depth buffer of the first image, in the memory 1640. The color buffer of each of the first through n-th tiles that are the tiles of the first image may be stored, as a color buffer of the first image, in the memory 1640.

Furthermore, the graphics pipeline 1634 may perform reprojection, as discussed above, based on the depth buffer and the color buffer of the first image, stored in the memory 1640, to generate a depth buffer and a color buffer of the second image. Also, the graphics pipeline 1634 perform reprojection, as discussed above, based on the depth buffer and the color buffer of the first image, stored in the memory 1640, to generate an occlusion map and a color buffer of the second image.

According to an embodiment, the graphics pipeline 1634 may perform rendering on the first tile of the tiles of the first image to generate a depth buffer and a color buffer of the first tile. The tile buffer 1636 may store the depth buffer and the color buffer of the first tile. The graphics pipeline 1634 may determine first pixels of the second image, which correspond to pixels of the first tile, based on the depth buffer of the first tile, stored in the tile buffer 1636. Also, the graphics pipeline 1634 may perform rendering on the second tile of the tiles of the first image to generate a depth buffer and a color buffer of the second tile. The tile buffer 1636 may store the depth buffer and the color buffer of the second tile. The graphics pipeline 1634 may determine another first pixels of the second image, which correspond to pixels of the second tile, based on the depth buffer of the second tile, stored in the tile buffer 1636. Likewise, the graphics pipeline 1634 may perform rendering on the n-th tile of the tiles of the first image and determine n-th first pixels of the second image, which correspond to pixels of the n-th tile, based on a depth buffer of the n-th tile. Accordingly, the graphics pipeline 1634 may generate an occlusion map that distinguishes the first pixels through the n-th first pixels of the second image from the remaining pixels (i.e., second pixels) of the second image, and may store the generated occlusion map in the memory 1640. Also, the graphics pipeline 1634 may determine a color value of each of the first pixels through n-th first pixels of the second image to be a color value of each of the pixels of the first through n-th tiles and determine a color value of each of the second pixels of the second image to be an arbitrary value, based on the color buffers of the first through n-th tiles, and thus generate a color buffer of the second image. Likewise, the graphics pipeline 1634 may determine a depth value of each of the first pixels through n-th first pixels of the second image to be a depth value of each of the pixels of the first through n-th tiles and determine a depth value of each of the second pixels of the second image to be a predetermined value, based on the depth buffers of the first through n-th tiles, and thus generate a depth buffer of the second image. The graphics pipeline 1634 may store the color buffer and the depth buffer of the second image in the memory 1640.

According to an embodiment, the graphics pipeline 1634 may select and render the second pixels of the second image, which do not correspond to pixels of the first image, based on the depth buffer and the color buffer of the second image, stored in the memory 1640. In other words, according to an embodiment, the graphics pipeline 1634 may sequentially read, from the memory 1640, depth buffers and color buffers of the first through n-th tiles of the second image, included in the depth buffer and the color buffer of the second image, and perform tile rendering on the read depth buffers and color buffers. The graphics pipeline 1634 may read a depth buffer and a color buffer of the n-th tile of the second image from the memory 1640 and store the read depth buffer and the read color buffer in the tile buffer 1636. Also, the graphics pipeline 1634 may select and render pixels of the n-th tile of the second image, which do not correspond to pixels of the first image, based on the depth buffer and the color buffer of the n-th tile, stored in the tile buffer 1636. Color values of the pixels of the n-th tile, determined as a result of rendering the second image, may be stored in the color buffer of the n-th tile, and the color buffer of the n-th tile may be stored in the memory 1640. Also, according to an embodiment, the graphics pipeline 1634 may select and render the second pixels of the second image, which do not correspond to pixels of the first image, based on an occlusion map and a color buffer, stored in the memory 1640. In other words, according to an embodiment, the graphics pipeline 1634 may sequentially read, from the memory 1640, color buffers of the first through n-th tiles of the second image, included in the color buffer of the second image, based on an occlusion map, and perform tile rendering on the read color buffers.

According to an embodiment, the scheduler 1632 may perform scheduling on each of the first through n-th tiles of the second image, and the graphics pipeline 1634 may perform tile rendering on the first through n-th tiles of the second image according to the scheduling.

According to an embodiment, the scheduler 1632 may determine whether to perform scheduling on each of the first through n-th tiles of the second image, based on an occlusion map. Also, the graphics pipeline 1634 may perform tile rendering on a tile to be scheduled. In other words, the scheduler 1632 may omit scheduling on a predetermined tile of the second image, determined based on an occlusion map, and as a result, the graphics pipeline 1634 may omit rendering on a predetermined tile. According to an embodiment, the scheduler 1632 may check whether there are pixels corresponding to pixels of the first image from among pixels of the first tile of the second image, based on an occlusion map, and may omit scheduling on the first tile of the second image if there are no pixels, which correspond to the pixels of the first image, in the first tile. Accordingly, the graphics pipeline 1634 may omit rendering on the first tile of the second image. Also, according to an embodiment, when generating the occlusion map, the graphics pipeline 1634 may generate the number of pixels of each tile of the second image, which correspond to the first pixels, as header information of an occlusion map. Accordingly, the scheduler 1632 may check the header information of the occlusion map, and may determine whether to perform scheduling on each tile of the second image, based on a checking result.

Descriptions for application 1610 and the device driver 1620 are similar to the above descriptions for application 1510 and the device driver 1520 of FIG. 15, respectively, and thus, such applicable repeated descriptions thereof are omitted. In addition, additional descriptions for the GPU 1630 and the memory 1640 are similar to the descriptions for the GPU 1530 and the memory 1540 of FIG. 15, respectively, and thus, such similarly applicable repeated descriptions thereof are omitted.

Figure 17:
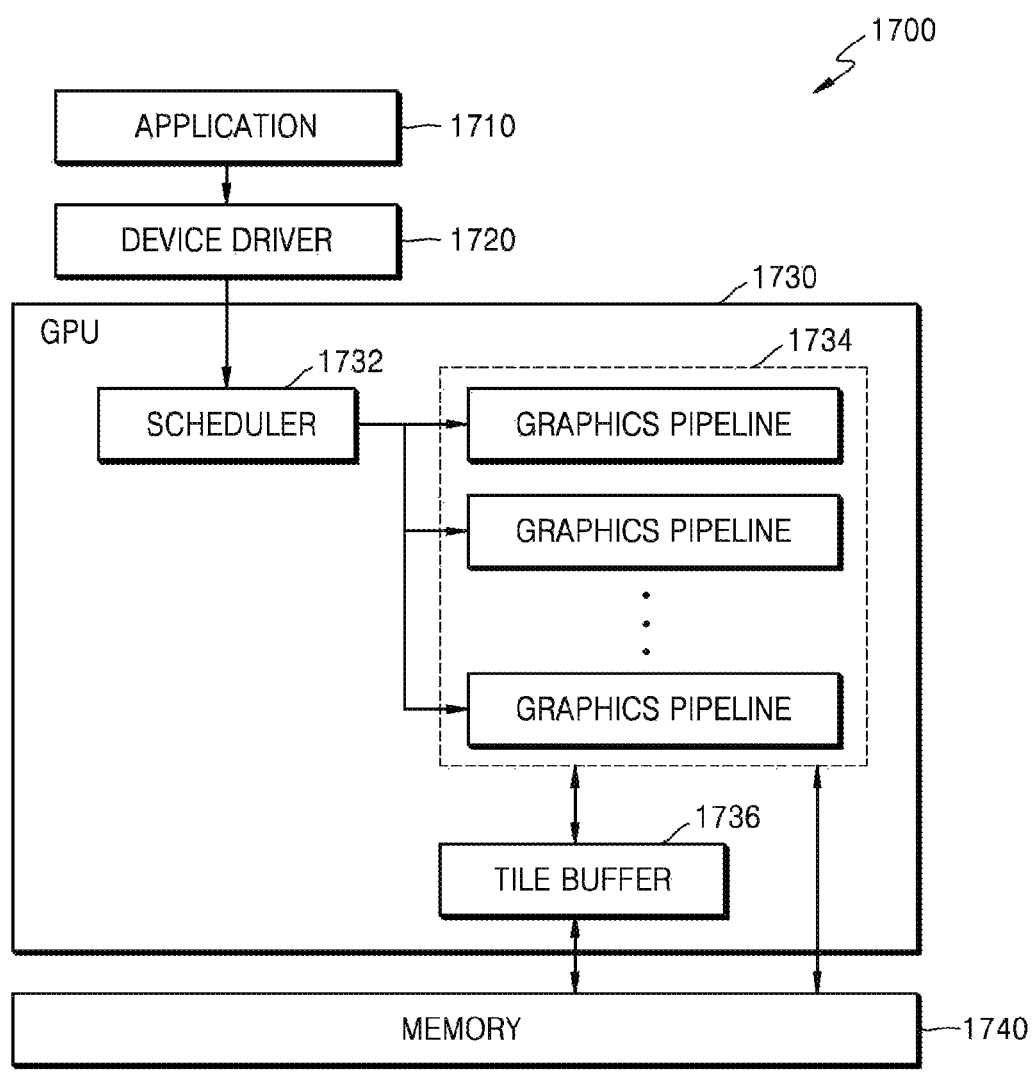
FIG. 17 is a block diagram of a device, according to one or more embodiments.

FIG. 17 is a block diagram of a device 1700, according to one or more embodiments.

The device 1700 may include an application 1710, a device driver 1720, a GPU 1730, and a memory 1740, for example, noting that elements in addition to the illustrated elements may be further included.

According to an embodiment, the GPU 1730 may include a scheduler 1732, a plurality of graphics pipelines 1734, and a tile buffer 1736, for example, noting that elements in addition to the illustrated scheduler 1732, graphics pipelines 1734, and tile buffer 1736 may be further included.

According to an embodiment, the scheduler 1632 may receive at least one draw command and state information for first and second images having binocular or viewpoint disparity from the device driver 1620.

According to an embodiment, the scheduler 1732 may divide at least one draw command into batches having a predetermined unit and assign the batches respectively to the plurality of graphics pipelines 1734. Also, according to an embodiment, when the scheduler 1732 assigns the batches to the plurality of graphics pipelines 1734, the scheduler 1732 may assign one batch to one graphics pipeline twice for each of the first and second images. In other words, when assigning a first batch of the batches to a first graphics pipeline of the plurality of graphics pipelines 1734, the scheduler 1732 may assign the first batch to the first graphics pipeline for the sake of the first image and assign the first batch to the first graphics pipeline for the sake of the second image.

According to an embodiment, the plurality of graphics pipelines 1734 may perform tile binning on each of the first and second images depending on assigned batches.

According to an embodiment, the plurality of graphics pipelines 1734 may perform tile binning the tile binning on each of the first and second images according to the assigned batches and the state information related to the assigned batches. According to an embodiment, the first graphics pipeline of the graphics pipeline 1634 may receive a first batch of the assigned batches and state information related to the first batch. Since the state information related to the first batch includes camera viewpoint information of each of the first and second images, even when the first batch is assigned only once, the first graphics pipeline may perform each of tile binning for the first image and tile binning for the second image according to the first batch and the state information related to the first batch. Also, according to an embodiment, the first graphics pipeline may be assigned with the first batch and the state information related to the first batch, twice, for each of the first and second images, and the first graphics pipeline may perform each of the tile binning for the first image and the tile binning for the second image.

Further descriptions for application 1710, the device driver 1720, the GPU 1730, and the memory 1740 are similar to descriptions for the application 1610, the device driver 1620, the GPU 1630, and the memory 1640 of FIG. 16, respectively, and thus, such similarly applicable repeated descriptions thereof are omitted. In addition, further descriptions for the scheduler 1732 and the tile buffer 1736 are similar to the above descriptions for the scheduler 1632 and the tile buffer 1636 of FIG. 16, respectively, and thus, such similarly applicable repeated descriptions thereof are omitted. Descriptions for each of the plurality of graphics pipelines 1734 are similar to the above descriptions for the graphics pipeline 1634 of FIG. 16, and thus, such similarly applicable repeated descriptions thereof are omitted.

Figure 18:
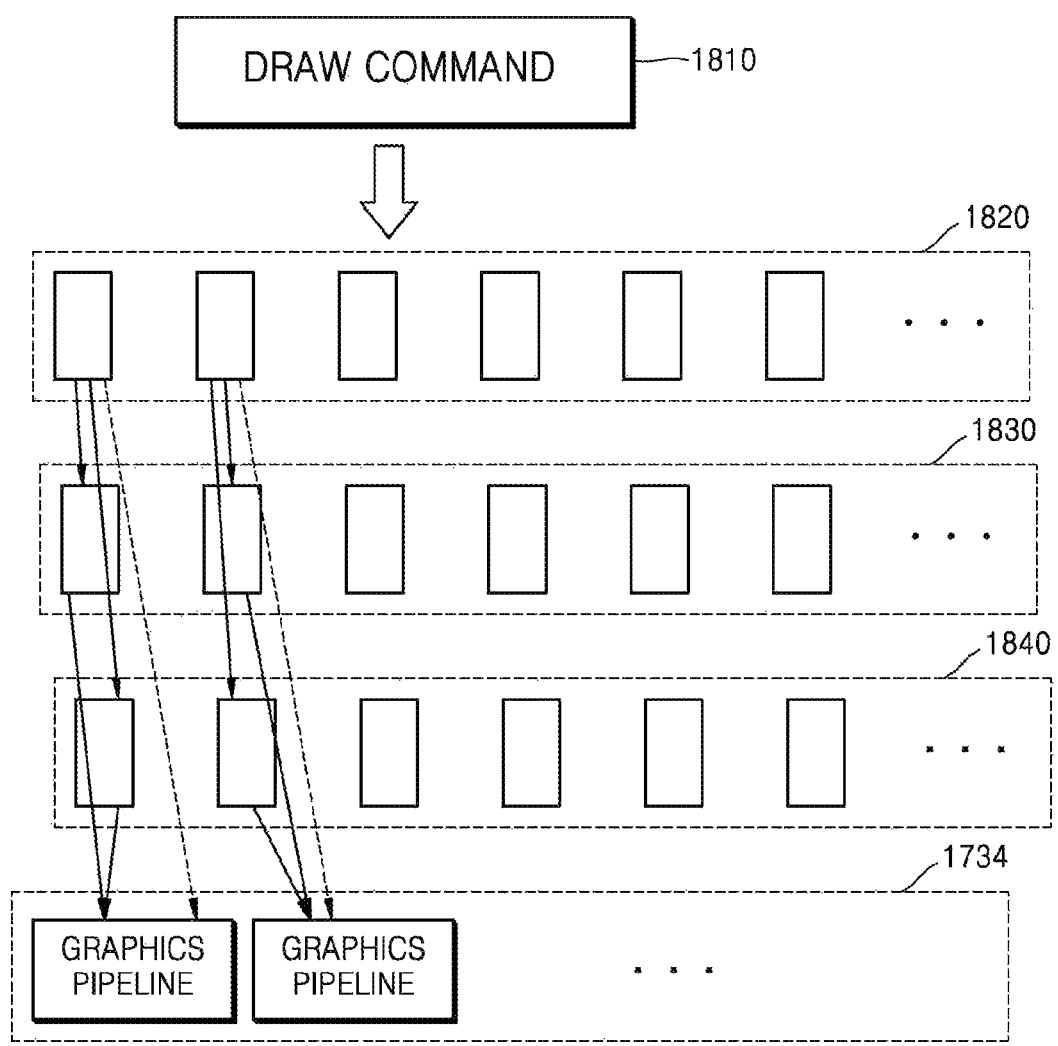
FIG. 18 illustrates an example in which a GPU performs tile binning, according to one or more embodiments.

FIG. 18 illustrates a method by which the GPU 1730, as only an example, may perform tile binning, according to one or more embodiments.

According to an embodiment, the scheduler 1732 may divide a draw command 1810 into a plurality of batches 1820. Also, the scheduler 1732 may assign the plurality of batches 1820 to the plurality of graphics pipelines 1734 as a plurality of batches 1830 for the first image and assign the plurality of batches 1820 to the plurality of graphics pipelines 1734 as a plurality of batches 1840 for the second image. In other words, the scheduler 1732 may assign the batches 1820 twice to the graphics pipelines 1734.

The plurality of graphics pipelines 1734 may perform tile binning on each of the first and second images, based on the assigned batches and the state information related to the assigned batches.

Alternatively, as indicated by dotted arrows in FIG. 18, the scheduler 1732 may assign the batches 1820 only once to the plurality of graphics pipelines 1734. Also, the scheduler 1732 may store the state information related to the batches 1820 in the tile buffer 1736. Accordingly, each of the plurality of graphics pipelines 1734 may perform the tile binning for the first image and the tile binning for the second image according to the state information stored in the tile buffer 1736 and the batches 1820.

Accordingly, since a batch assigned to a graphics pipeline targets at the same primitive, the graphics pipeline may perform tile binning on a target of the same primitive for each of the first and second images, based on the assigned batch, which may reduce access to an internal memory where information about the primitive is stored.

The plurality of graphics pipelines 1734 may perform tile binning to generate binning information that indicates in which tile of the first and second images at least one draw command is performed. According to an embodiment, the plurality of graphics pipelines 1734 may store the binning information generated as a result of the tile binning to the tile buffer 1736 or the memory 1740.

Figure 19:
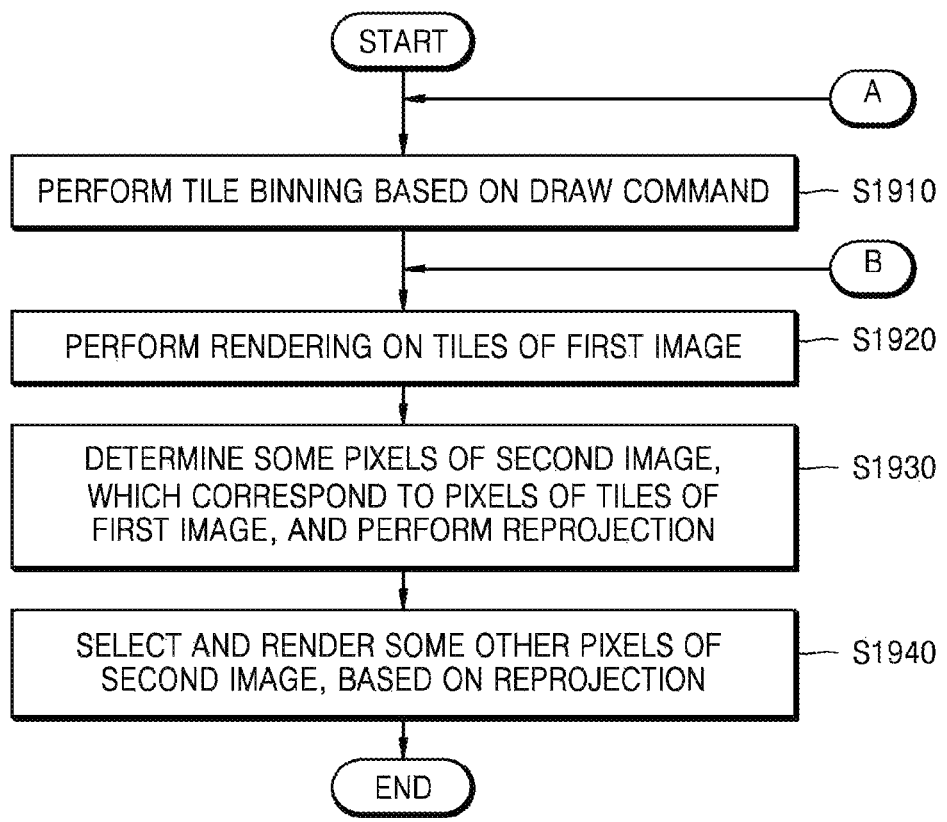
FIG. 19 is a flowchart illustrating a method by which a device performs tile rendering on first and second images having binocular or viewpoint disparity, according to one or more embodiments.

FIG. 19 is a flowchart illustrating a method by which the device 1500, 1600, or 1700, as only examples, may perform tile rendering on first and second images having binocular or viewpoint disparity, according to one or more embodiments.

In this example, as the method illustrated in FIG. 19 is being explained through operations of the device 1500, 1600, or 1700, again as only an example, a repeated description of operations of devices 1500, 1600, or 1700 is omitted.

In operation S1910, the device 1500, 1600, or 1700 may perform tile binning on each of the first and second images having binocular or viewpoint disparity, based on at least one draw command. More specifically, the device 1500, 1600, or 1700 may perform tile binning, based on the at least one draw command and state information related to the at least one draw command. An embodiment about performing the tile binning is described below in detail with reference to FIG. 20.

Figure 20:
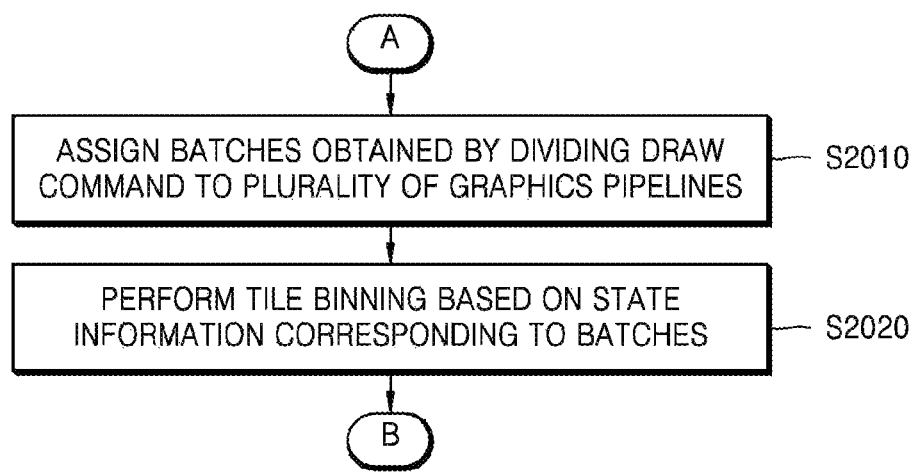
FIG. 20 is a flowchart illustrating operations of operation S1910 of FIG. 19, according to one or more embodiments.

FIG. 20 is a flowchart illustrating operations of operation S1910 of FIG. 19, according to one or more embodiments.

In operation S2010, the device 1700, as only an example, may divide the at least one draw command into batches, each having a predetermined unit, and assign the divided batches respectively to a plurality of graphics pipelines in the device 1700. Also, according to an embodiment, the device 1700 may assign the batches to the respective graphics pipelines twice for each of the first and second images. In other words, when the first batch of the batches is assigned to the first graphics pipeline among the plurality of graphics pipelines, the device 1700 may assign the first batch to the first graphics pipeline for the sake of the first image and assign the first batch to the first graphics pipeline for the sake of the second image.

In operation S2020, the device 1700 may perform the tile binning on each of the first and second images, based on the assigned batches and the state information corresponding to the batches, according to an embodiment. In detail, the plurality of graphics pipelines in the device 1700 may be assigned twice with the batches and the state information related to the batches. Accordingly, the plurality of graphics pipelines may respectively perform the tile binning for the first image and the tile binning for the second image. Also, since the state information related to the batches includes the camera viewpoint information of each of the first and second images, even when the batches and the state information are assigned once, the plurality of graphics pipelines may perform the tile binning for the first image and the tile binning for the second image.

In operation S1920 of FIG. 19, any of the device 1500, 1600, or 1700, as only examples, may perform rendering on tiles of the first image. In other words, in this example, any of the device 1500, 1600, or 1700 may sequentially perform rendering on first through n-th tiles that are the tiles of the first image, and may generate a depth buffer or a color buffer of each of the first through n-th tiles. Also, according to an embodiment, such device 1500, 1600, or 1700 may temporarily store in an internal buffer a depth buffer or color buffer of at least one of sequentially generated tiles to the extent of acceptable capacity. The at least one depth buffer or color buffer temporarily stored in the internal buffer may be stored in an internal memory of such device 1500, 1600, or 1700 according to a flush command. Accordingly, the depth buffer of each of the first through n-th tiles that are the tiles of the first image may be stored, as a depth buffer of the first image, in the internal memory of such device 1500, 1600, or 1700. The color buffer of each of the first through n-th tiles that are the tiles of the first image may be stored, as a color buffer of the first image, in the internal memory of such device 1500, 1600, or 1700.

In operation S1930, the example device 1500, 1600, or 1700 may determine the example first pixels of the second image, which correspond to pixels of the tiles of the first image, based on a depth buffer of each of the tiles of the first image, and perform reprojection on the selected pixels. More specifically, such device 1500, 1600, or 1700 may determine first pixels of the second image, which correspond to the pixels of a first tile of the tiles, based on a depth buffer of the first tile of the tiles in the first image. Also, such device 1500, 1600, or 1700 may determine another first pixels of the second image, which correspond to pixels of a second tile of the tiles, based on a depth buffer of the second tile of the tiles in the first image. Likewise, such device 1500, 1600, or 1700 may determine n-th first pixels of the second image, which correspond to pixels of an n-th tile of the tiles, based on a depth buffer of the n-th tile of the tiles in the first image. Accordingly, such device 1500, 1600, or 1700 may generate an occlusion map that distinguishes the first pixels through n-th first pixels of the second image from the remaining pixels (i.e., second pixels) of the second image, and may store the generated occlusion map in an internal memory. Also, such device 1500, 1600, or 1700 may determine a color value of each of the first pixels through n-th first pixels of the second image to be a color value of each of the pixels of the first through n-th tiles of the first image and determine a color value of each of the second pixels of the second image to be an arbitrary value, based on the color buffers of the first through n-th tiles of the first image, and thus generate a color buffer of the second image. Likewise, such device 1500, 1600, or 1700 may determine a depth value of each of the first pixels through n-th first pixels of the second image to be a depth value of each of the pixels of the first through n-th tiles of the first image and determine a depth value of each of the second pixels of the second image to be a predetermined value, based on the depth buffers of the first through n-th tiles, and thus generate a depth buffer of the second image. Such device 1500, 1600, or 1700 may store the color buffer and the depth buffer of the second image in an internal memory.

In operation S1940, the example device 1500, 1600, or 1700 may select and render the second pixels of the second image, based on reprojection. According to an embodiment, such device 1500, 1600, or 1700 may select and render the second pixels of the second image, which do not correspond to pixels of the first image, based on previously stored depth buffer and color buffer of the second image. In other words, according to an embodiment, such device 1500, 1600, or 1700 may sequentially read, from an internal memory, depth buffers and color buffers of the first through n-th tiles of the second image, included in the depth buffer and the color buffer of the second image, and perform tile rendering on the read depth buffers and color buffers for the second pixels. For example, such device 1500, 1600, or 1700 may read a depth buffer and a color buffer of the n-th tile of the second image from an internal memory and store the read depth buffer and the read color buffer in an internal buffer, e.g., without rendering, while such device 1500, 1600, or 1700 may then select and render pixels of the n-th tile of the second image that do not correspond to pixels of the first image. The respectively calculated color values of the second pixels of the n-th tile, determined as a result of rendering, may be stored (or updated) in the color buffer of the n-th tile, and the color buffer of the n-th tile may then be stored in the internal memory. Also, according to an embodiment, such device 1500, 1600, or 1700 may select and render the second pixels of the second image, which do not correspond to pixels of the first image, based on an occlusion map and a color buffer, previously stored in the internal memory. In other words, according to an embodiment, such device 1500, 1600, or 1700 may sequentially read, from the internal memory, color buffers of the first through n-th tiles of the second image, included in the color buffer of the second image, based on an occlusion map, and perform tile rendering on the read color buffers.

Also, according to an embodiment, the example device 1500, 1600, or 1700 may perform scheduling on each of the first through n-th tiles of the second image, and such device 1500, 1600, or 1700 may perform tile rendering on the first through n-th tiles of the second image according to the scheduling.

According to an embodiment, the example device 1500, 1600, or 1700 may determine whether to perform scheduling on each of the first through n-th tiles of the second image, based on the occlusion map. Also, such device 1500, 1600, or 1700 may perform tile rendering on a tile to be scheduled. In other words, such device 1500, 1600, or 1700 may omit scheduling on a predetermined tile of the second image, determined depending on an occlusion map, and as a result, such device 1500, 1600, or 1700 may omit rendering on a predetermined tile. According to an embodiment, such device 1500, 1600, or 1700 may check whether there are pixels corresponding to pixels of the first image from among pixels of the first tile of the second image, based on the occlusion map, and may omit scheduling on the first tile if there are no such pixels that correspond to the pixels of the first image, in the first tile. Accordingly, such device 1500, 1600, or 1700 may omit rendering on that first tile of the second image. Also, according to an embodiment, the example device 1500, 1600, or 1700 may generate the number of pixels of each tile of the second image, which correspond to the first pixels, as header information of an occlusion map when generating the occlusion map. Accordingly, such device 1500, 1600, or 1700 may check the header information of the occlusion map, and may determine whether to perform scheduling on each tile of the second image, based on a check result.

Figure 21:
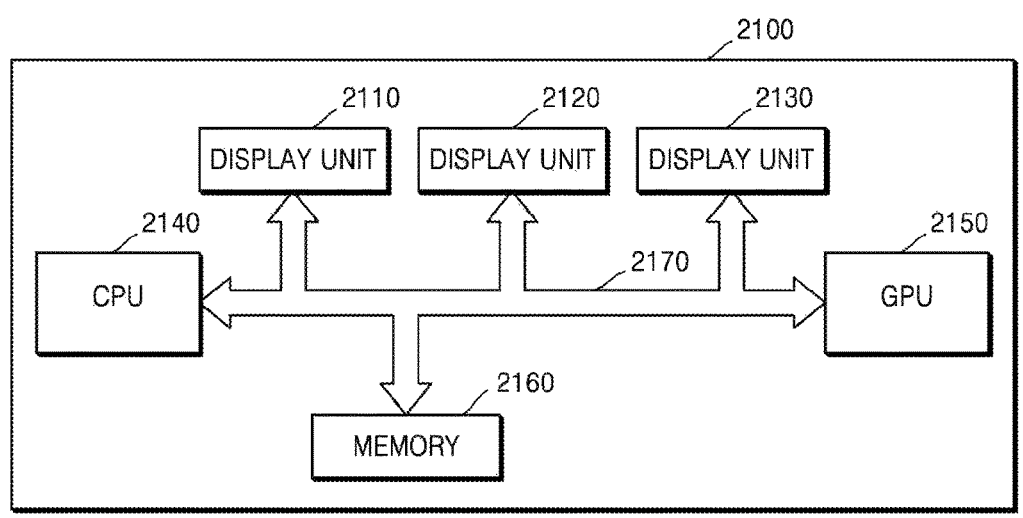
FIG. 21 is a block diagram of a device, according to one or more embodiments.

FIG. 21 is a block diagram of a device 2100, according to one or more embodiments.

Referring to FIG. 21, the device 2100 may include a GPU 2150, a central processing unit (CPU) 2140, a memory 2160, a bus 2170, a display unit 2110, an input unit 2120, and a communication unit 2130, for example, noting that elements in addition to the illustrated elements may be further included.

The CPU 2140 is hardware that controls overall operations and functions of the device 2100. For example, the CPU 2140 may drive an operating system (OS), access a graphics application programming interface (API) for the GPU 2150, and execute a driver of the GPU 2150. Also, the CPU 2140 may execute various applications stored in the memory 2160, for example, a web browsing application, a game application, and a video application.

The display unit 2110 is a display interface unit for displaying various kinds of information, such as information processed or to be processed by the device 2100, to a user. The display unit 2110 may display a graphical user interface (GUI) for visually and intuitively providing information processed by the device 2100 to a user. For example, the display unit 2110 may display graphic data processed by the GPU 2150. The display unit 2110 may be implemented with various display panels, such as a liquid crystal display (LCD), a light emitting diode (LED), and a plasma display panel (PDP).

The input unit 2120 is an input interfacing unit for receiving information from a user. The input unit 2120 may be a touch pad, a trackball, a mouse, a keyboard, or a game controller. The display unit 2110 and the input unit 2120 may be implemented with hardware of an integrated touch screen.

The communication unit 2130 may include a mobile communication module, a wired/wireless local area network (LAN) module, a Wi-Fi module, a Bluetooth module, and/or a near field communication (NFC) module.

Further descriptions for GPU 2150 and the memory 2160 of FIG. 21 are similar to any of the above descriptions for GPU 110 and the memory 120 of FIG. 1, the GPU 410 and the memory 420 of FIG. 4, the GPU 1110 and the memory 1120 of FIG. 11, the GPU 1530 and the memory 1540 of FIG. 15, the GPU 1630 and the memory 1640 of FIG. 16, or the GPU 1730 and the memory 1740 of FIG. 17, and thus, such similarly applicable repeated descriptions for the GPU 2150 and the memory 2160 are omitted here.

According to one or more embodiments, in first and second images having binocular or viewpoint disparity, a tile of the second image that is determined similar or most similar to a tile of the first image may be identified. A rendering order of the tiles of the first and second image may also be determined such that the tiles of the first and second images that are similar to each other are rendered by the same graphics processor. Since the tiles of the first and second images which are similar to each other are rendered by the same graphics processor, unnecessary access to an external memory is reduced and thus more efficient rendering is available compared to a rendering operation that results in similar tiles being rendered by different graphics processors.

The apparatuses, units, modules, devices, and other components illustrated in FIGS. 1, 4, 11, 14-17, and 21, for example, that may perform operations described herein with respect to FIGS. 2-3, 5-10, 12-13, and 18-20, for example, are implemented by hardware components. Examples of hardware components include controllers, sensors, memory, drivers, and any other electronic components known to one of ordinary skill in the art. In one example, the hardware components are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing computer readable code, instructions, or software that are executed by the processing device, processor, or computer and that may control the processing device, processor, or computer to implement one or more methods described herein. Hardware components implemented by a processing device, processor, or computer, e.g., by implementing computer execute code, instructions, or software, such as an operating system (OS) and one or more software applications that run on the OS, may perform the operations described herein with respect to FIGS. 2-3, 5-10, 12-13, and 18-20, as only an example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. In addition, connecting lines or connectors shown in the various above referred to apparatus figures are intended to represent example functional relationships and/or physical or logical couplings between the various hardware elements, with many alternative or additional functional relationships, physical connections, or logical connections may be present in a corresponding device embodiment.

The methods illustrated in FIGS. 2-3, 5-10, 12-13, and 18-20 that perform the operations described herein may be performed by a processing device, processor, or a computer as described above executing processor or computer readable code, instructions, or software to perform the operations described herein.

Processor or computer readable code, instructions, or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the processor or computer readable code, instructions, or software include machine code that is directly executed by the processing device, processor, or computer, such as machine code produced by a compiler. In another example, the processor or computer readable code, instructions, or software include higher-level code that is executed by the processing device, processor, or computer using an interpreter, such as implemented with any programming or scripting language such as C, C++, Java, assembler, or the like, with the various algorithms being implemented with any combination of data structures, objects, processes, routines or other programming elements. Based on the disclosure herein, and after an understanding of the same, programmers of ordinary skill in the art can readily write the processor or computer readable code, instructions, or software based on the block diagrams and the flow charts illustrated in the drawings and the corresponding descriptions in the specification, which disclose algorithms for performing the operations performed by the hardware components and the methods as described above.

The processor or computer readable code, instructions, or software to control a processing device, processor, or computer to implement the hardware components, such as discussed in any of FIGS. 1, 4, 11, 14-17, and 21, and perform the methods as described above in any of FIGS. 2-3, 5-10, 12-13, and 18-20, and any associated data, data files, and data structures, are recorded, stored, or fixed in or on one or more non-transitory computer-readable storage media. Examples of a non-transitory processor or computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the processor or computer readable code, instructions, or software and any associated data, data files, and data structures in a non-transitory manner and providing the processor or computer readable code, instructions, or software and any associated data, data files, and data structures to a processing device, processor, or computer so that the processing device, processor, or computer can execute the instructions. In one example, the processor or computer readable code, instructions, or software and any associated data, data files, and data structures are distributed over network-coupled computer systems so that the instructions and software and any associated data, data files, and data structures are stored, accessed, and executed in a distributed fashion by the processing device, processor, or computer.

As a non-exhaustive example only, an electronic device embodiment herein, such as described above with regard to FIGS. 1, 4, 11, 14-17, and 21, and/or configured to implement the methods described with regard to FIGS. 2-3, 5-10, 12-13, and 18-20, may include a mobile device, such as a cellular phone, a smart phone, a wearable smart device, a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. Depending on embodiment, the electronic device includes a display. One or more embodiments may include an electronic device system, wherein the system includes any of the graphics devices of FIGS. 1, 4, 11, 14-17, and 21 and a separated display, as only an example.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

What is claimed is:

1. A method of performing rendering on first and second images having binocular or viewpoint disparity, the method comprising:
rendering the first image to generate depth information associated with pixels of the first image;
performing reprojection of the second image, the reprojection including,
identifying first pixels of the second image that correspond to pixels of the first image and second pixels of the second image that do not correspond to pixels of the first image, the identifying being based on the depth information associated with the pixels of the first image,
identifying a pixel group of the second image, the pixel group including the second pixels and selected pixels of the first pixels, each selected pixel of the first pixels neighboring a pixel in the second pixels, and
generating an occlusion map to indicate each of the first pixels of the second image in the occlusion map by a set first value and to indicate each of the second pixels of the second image in the occlusion map by a set second value; and
rendering the second image, the rendering including,
rasterizing the second pixels in the pixel group of the second image for which pixels of the occlusion map have the second value, the rasterizing including calculating color information for the second pixels in the pixel group of the second image, and using an average color value for color information for the selected pixels of the first pixels of the pixel group, the average color value being an average of the calculated color information for the second pixels and color information corresponding to the first pixels of the pixel group.

2. The method of claim 1, wherein
the generating the occlusion map includes generating the occlusion map to distinguishes the first pixels of the second image from the second pixels of the second image; and
the rendering the second image comprises rasterizing the second pixels of the second image based on the occlusion map.

3. The method of claim 2, wherein, when respective rendering performed on the first and second images is tile-based rendering, the rendering further comprises:
determining whether to perform scheduling on each tile of the second image, based on the occlusion map; and
performing tile-rendering on a tile to be scheduled based on a result of the determining of whether to perform the scheduling.

4. The method of claim 1, wherein the generating of the occlusion map further comprises:
setting a second pixel group that includes the second pixels of the second image and select pixels of the first pixels that neighbor the second pixels; and
setting each pixel of the second pixel group in the occlusion map to be the second value.

5. The method of claim 1, wherein
the performing of the reprojection comprises setting a first pixel group, which includes the second pixels of the second image and some of the first pixels of the second image, to a desired value to generate an expanded occlusion map; and
the rendering the second image comprises rasterizing the first pixel group based on the expanded occlusion map.

6. The method of claim 1, wherein
the performing of the reprojection comprises,
determining a depth value of each of the second pixels of the second image to be a desired value that meets a depth test to generate a depth buffer of the second image; and
the rendering comprises,
performing the depth test on the first pixels and the second pixels of the second image using the depth buffer of the second image, and
performing pixel shading on only pixels of the second image that meet the depth test during rendering of the second image.

7. The method of claim 1, wherein
the performing of the reprojection comprises,
determining respective color values of each of the first pixels of the second image to be a color value of a determined corresponding pixel of the first image, and determining a color value of each of the second pixels of the second image to be a desired value based on color information of the first image that is generated as a result of the rendering performed on the first image, to generate a color buffer of the second image; and the rendering the second image comprises,
calculating respective color values for each of the second pixels of the second image, and
changing the determined desired color value of each of the second pixels of the second image to respectively be the calculated respective color values for each of the second pixels of the second image, to revise the color buffer of the second image.

8. The method of claim 1, wherein the rendering of the first image to generate the depth information of the first image comprises:
receiving a draw command for the first and second images; and
performing the rendering of the first image based on the received draw command.

9. The method of claim 8, wherein the draw command comprises state information for each of the first and second images.

10. The method of claim 1, wherein
when respective rendering to be performed on the first and second images is tile-based rendering, the performing of rendering on the first image to generate the depth information of the first image comprises performing rendering on each tile of the first image to generate a depth buffer for each of the tiles; and
the performing of reprojection comprises determining first pixels of the second image that correspond to pixels of each of the tiles of the first image based on the depth buffer of each of the tiles.

11. The method of claim 1, wherein, when respective rendering to be performed on the first and second images is tile-based rendering, the method further comprises:
performing tile binning on the first and second images, based on a draw command for the first and second images.

12. The method of claim 11, wherein the performing tile binning comprises:
dividing the draw command into batches and assigning the batches to a plurality of graphics pipelines; and
when a first batch of the batches is assigned to a first graphics pipeline of the plurality of graphics pipelines, performing tile binning on each of the first and second images based on the first batch and state information corresponding to the first batch.

13. A non-transitory recording medium comprising coding to control at least one processing device to implement the method of claim 1.

14. A rendering device, the device comprising:
a graphics processing unit (GPU) configured to render a first image to generate depth information associated with pixels of the first image; and
a memory configured to store the depth information associated with the pixels of the first image,
wherein the GPU is further configured to,
perform reprojection of a second image, the reprojection including
identifying first pixels of the second image that correspond to pixels of the first image and second pixels of the second image that do not correspond to pixels of the first image, the identifying being based on the depth information associated with the pixels of the first image,
identifying a pixel group of the second image, the pixel group comprising the second pixels and selected pixels of the first pixels, each selected pixel of the first pixels neighboring a pixel in the second pixels,
generating an occlusion map to indicate each of the first pixels of the second image in the occlusion map by a set first value and to indicate each of the second pixels of the second image in the occlusion map by a set second value, and
render the second image, the rendering including,
rasterizing the second pixels in the pixel group of the second image for which pixels of the occlusion map have the second value, the rasterizing including calculating color information for the second pixels in the pixel group of the second image, and using an average color value for color information for the selected pixels of the first pixels of the pixel group, the average color value being an average of the calculated color information for the second pixels and color information corresponding to the first pixels of the pixel group; and
wherein the first and second images have binocular or viewpoint disparity.

15. The device of claim 14, wherein the GPU comprises:
a shader configured to generate the occlusion map, the occlusion map distinguishing the first pixels of the second image from the second pixels of the second image; and
a rasterizer configured to render the second image by rasterizing the second pixels of the second image based on the occlusion map.

16. The device of claim 15, wherein
the shader is configured to set a first pixel group, which includes the second pixels of the second image and some of the first pixels of the second image, to a desired value to generate an expanded occlusion map; and
the rasterizer is configured to rasterize the first pixel group based on the expanded occlusion map.

17. The device of claim 15, wherein, the GPU further comprises:
a scheduler configured to determine whether to perform scheduling on each of plural tiles of the second image based on the occlusion map; and
a graphics pipeline configured to perform tile-rendering on a tile to be scheduled based on the determining by the scheduler.

18. The device of claim 14, wherein, the GPU comprises a shader configured to perform the generating of the occlusion map, and the shader is further configured to perform the generating of the occlusion map by:
setting a second pixel group that includes the second pixels of the second image and select pixels of the first pixels that neighbor the second pixels; and
setting each pixel of the second pixel group in the occlusion map to be the second value.

19. The device of claim 14, wherein the GPU comprises:
a shader configured to,
determine respective depth values of each of the first pixels of the second image to be the depth value of a determined corresponding pixel of the first image and determine a depth value of each of the second pixels of the second image to be a desired value that meets a depth test to generate a depth buffer of the second image; and a Z-tester configured to perform the depth test on the first pixels and the second pixels of the second image using the depth buffer of the second image, wherein the GPU is configured to perform pixel shading on only pixels of the second image that meet the depth test during rendering of the second image.

20. The device of claim 14, wherein the GPU comprises:
a shader configured to,
   determine respective color values of each of the first pixels of the second image to be a color value of a determined corresponding pixel of the first image, and
   determine a color value of each of the second pixels of the second image to be a desired value based on color information of the first image that is generated as a result of the rendering performed on the first image, to generate a color buffer of the second image,
wherein the GPU is configured to,
   calculate respective color values for each of the second pixels of the second image, and
   change the determined desired color value of each of the second pixels of the second image to respectively be the calculated respective color values for each of the second pixels of the second image, to revise the color buffer of the second image.

21. The device of claim 14, wherein the GPU is configured to:
receive a draw command for the first and second images; and
perform the rendering on the first image based on the received draw command.

22. The device of claim 21, wherein the draw command comprises state information for each of the first and second images.

23. The device of claim 14, wherein
the GPU is configured to render each of plural tiles of the first image to generate a depth buffer of each of the tiles; and
the memory is configured to store the depth buffer of each of the tiles; and
the GPU is configured to determine first pixels of the second image that correspond to pixels of each of the tiles of the first image based on the depth buffer of each of the tiles, and to perform the reprojection based on the determined first pixels of the second image that correspond to the pixels of the tiles.

24. The device of claim 14, wherein the GPU is configured to:
divide a draw command into batches and assign the batches to a plurality of graphics pipelines; and
when a first batch of the batches is assigned to a first graphics pipeline of the plurality of graphics pipelines, perform tile binning on each of the first and second images based on the first batch and state information corresponding to the first batch.

25. A method of performing rendering on first and second images having binocular or viewpoint disparity, the method comprising:
rendering the first image to generate depth information associated with pixels of the first image;
performing reprojection of the second image, the reprojection including,
   identifying first pixels of the second image that correspond to pixels of the first image and second pixels of the second image that do not correspond to pixels of the first image, the identifying being based on the depth information associated with the pixels of the first image,
   identifying a pixel group of the second image, the pixel group including the second pixels and selected pixels of the first pixels, each selected pixel of the first pixels neighboring a pixel in the second pixels, and
   generating an occlusion map to indicate each of the first pixels of the second image in the occlusion map by a set first value and to indicate each of the second pixels of the second image in the occlusion map by a set second value; and
rendering the second image, the rendering including,
   rasterizing the second pixels in the pixel group of the second image for which pixels of the occlusion map have the second value, the rasterizing including calculating color information for the second pixels in the pixel group of the second image, and using an average color value for color information for the selected pixels of the first pixels of the pixel group, the average color value being an average of the calculated color information for the second pixels and color information corresponding to the first pixels of the pixel group.

* * * * *